United States Patent
Peltonen et al.

[11] Patent Number: 5,926,807
[45] Date of Patent: Jul. 20, 1999

[54] METHOD AND SYSTEM FOR EFFECTIVELY REPRESENTING QUERY RESULTS IN A LIMITED AMOUNT OF MEMORY

[75] Inventors: Kyle Gordon Peltonen, Issaquah; Alan Whitney, Redmond; Bartosz Milewski, Seattle; Srikanth Shoroff, Issaquah, all of Wash.

[73] Assignee: Microsoft Corporation, Redmond, Wash.

[21] Appl. No.: 08/853,312

[22] Filed: May 8, 1997

[51] Int. Cl.$^6$ .................................................. G06F 17/30
[52] U.S. Cl. ........................................ 707/3; 707/4; 707/5
[58] Field of Search .................................. 707/5, 4, 1, 3

[56] References Cited

U.S. PATENT DOCUMENTS

| | | | |
|---|---|---|---|
| 4,754,326 | 6/1988 | Kram et al. | 364/900 |
| 5,157,783 | 10/1992 | Anderson et al. | 707/605 |
| 5,199,104 | 3/1993 | Hirayama | 395/145 |
| 5,524,201 | 6/1996 | Shwarts et al. | 395/161 |
| 5,590,319 | 12/1996 | Cohen et al. | 707/4 |
| 5,596,686 | 1/1997 | Duluk, Jr. | 395/122 |
| 5,611,076 | 3/1997 | Durflinger et al. | 707/102 |
| 5,615,337 | 3/1997 | Zimowski et al. | 395/200.01 |
| 5,632,015 | 5/1997 | Zimowski et al. | 395/200.01 |
| 5,668,987 | 9/1997 | Schneider | 707/3 |
| 5,689,698 | 11/1997 | Jones et al. | 707/4 |
| 5,701,461 | 12/1997 | Dalal et al. | 707/4 |
| 5,710,915 | 1/1998 | McElhiney | 707/3 |
| 5,713,014 | 1/1998 | Durflinger et al. | 707/4 |
| 5,713,020 | 1/1998 | Reiter et al. | 707/102 |
| 5,715,450 | 2/1998 | Ambrose et al. | 707/103 |
| 5,787,295 | 7/1998 | Nakao | 395/761 |

*Primary Examiner*—Thomas G. Black
*Assistant Examiner*—Frantz Coby
*Attorney, Agent, or Firm*—Seed and Berry LLP

[57] ABSTRACT

A method and system for effectively representing a result set in a limited amount of memory is provided. The result set is made up of a number of ordered rows. At least some of the rows contain row data, while each of the rows contains a bookmark that may be used to retrieve row data for the row. When it is determined that the size of the result set should be reduced, a subset of the rows of the result set is identified. The identified subset of rows is contiguous within the order of the results set and includes rows that contain row data. For each row of the identified subset, the row data is removed from the result set while retaining in the result set the bookmarks of the rows in the identified subset. As the result of the removal of row data, the size of the result set is reduced. In a further embodiment of the invention, when a request is received to return the row data for a row among the identified subset of rows, the retained bookmarks for the identified subset of rows are used to retrieve row data for the rows back into the result set. The requested row data is then returned from the result set in response to the request.

53 Claims, 30 Drawing Sheets

METHOD AND SYSTEM FOR EFFECTIVELY REPRESENTING QUERY RESULTS IN A LIMITED AMOUNT OF MEMORY

TECHNICAL FIELD

The invention relates generally to the field of databases, and, more specifically, to the field of representing database query results.

BACKGROUND OF THE INVENTION

A database is a collection of data that may be retrieved by users. In order to retrieve data from a database, users may formulate a query that specifies the data to be retrieved and submit the query to a database engine. The database engine interacts directly with the database to process the query and return the data that the query specifies, called a query result. Instead of directly formulating and submitting a query, many users interact with a database engine via a database front end. Database front ends provide user interfaces that generally help the user to formulate database queries, submit queries to the database engine for processing, and display query results. Query results are generally organized as a number of rows, each containing row data. All of the rows of a query result are known collectively as its "result set."

For a result set containing a large number of rows, it is unusual for a user to review all of the rows at one time. Indeed, sometimes a user reviews only a few rows from a large result set. This observation is the basis for a conventional approach in which the database engine generates only those rows of the result set that the user is presently requesting to display using the front end. The engine then produces additional rows of the result set in response to further user requests to display rows using the front end. This approach, however, requires the database engine to maintain extensive state information about the status of the query until the user finishes reviewing the query results. Further, the need to reinvoke the database engine when processing each subsequent user request for results causes response time for such requests to be relatively high.

In an alternative approach, the database engine performs the query as a single operation, and the query results produced by performing the query are maintained in memory in their entirety by the front end or an intermediary program while the user is using the front end to review them. For large result sets, this technique can require excessive amounts of RAM and/or excessive levels of virtual memory paging.

Given the drawbacks of these conventional approaches, a scheme for effectively representing query results in a limited amount of memory would be desirable.

Because embodiments of Applicants' invention described hereinafter are implemented using object-oriented programming, a brief discussion of object-oriented programming techniques follows.

Two common characteristics of object-oriented programming languages are support for data encapsulation and data type inheritance. Data encapsulation refers to the binding of functions and data. Inheritance refers to the ability to declare a data type in terms of other data types. In the C++ language, data encapsulation and inheritance are supported through the use of classes. A class is a user-defined type. A class declaration describes the data members and function members of the class. A function member is also referred to as a method of a class. The data members and function members of a class are bound together in that the function operates on an instance of the class. An instance of a class is also called an object of the class. Thus, a class provides a definition for a group of objects with similar properties and common behavior.

To allocate storage for an object of a particular type (class), an object is instantiated. Once instantiated, data can be assigned to the data members of the particular object. Also, once instantiated, the function members of the particular object can be invoked to access and manipulate the data members. Thus, in this manner, the function members implement the behavior of the object, and the object provides a structure for encapsulating data and behavior into a single entity.

To support the concept of inheritance, classes may be derived from (based upon the declaration of) other classes. A derived class is a class that inherits the characteristics—data members and function members—of its base classes. A class that inherits the characteristics of another class is a derived class. A class that does not inherit the characteristics of another class is a primary (root) class. A class whose characteristics are inherited by another class is a base class. A derived class may inherit the characteristics of several classes; that is, a derived class may have several base classes. This is referred to as multiple inheritance.

A class may also specify whether its function members are virtual. Declaring that a function member is virtual means that the function can be overridden by a function of the same name and type in a derived class. If a virtual function is declared without providing an implementation, then it is referred to as a pure virtual function. If a class specifies a pure virtual function, then any derived class needs to specify an implementation for that function member before that function member may be invoked. A class which contains at least one pure virtual function member is an abstract class.

An advantage of using object-oriented techniques is that these techniques can be used to facilitate the sharing of objects. To allow an object of an arbitrary class to be shared with a client program, interfaces are defined through which an object can be accessed without the need for the client program to have access to the class definitions at compile time. An interface is a named set of logically related function members. In C++, an interface is an abstract class with no data members and whose virtual functions are all pure. Thus, an interface provides a published protocol for two programs to communicate. Interfaces are typically used for derivation: a program defines (implements) classes that provide implementations for the interfaces the classes are derived from. Thereafter, objects are created as instances of these derived classes. Objects instantiated from a derived class implementing particular interfaces are said to "support" the interfaces. An object supports one or more interfaces depending upon the desired functionality.

SUMMARY OF THE INVENTION

The present invention provides a method and system for effectively representing query results in a limited, user configurable amount of memory. At a high level, the invention divides the rows of a query result into a number of groups, and maintains complete row data for the rows of only those groups containing rows whose row data is likely to be retrieved. By maintaining complete data for the groups containing rows whose row data is likely to be retrieved, the invention can quickly service requests to return row data for these rows. By declining to maintain complete row data for rows in other groups, the invention reduces the size of its representation of the query result, thereby conserving memory.

In accordance with the invention, a query result table management facility ("the facility") manages the results of a database query obtained from a row source, such as a database engine, for access by a row sink, such as a database front end. The facility orders the rows of the result set based upon the value for each row of a sort key, called the "primary key" or "key." The facility further divides the ordered rows into a number of subsets, called "table segments" or "segments," that each contain the rows whose keys fall within a distinct subrange of key values. The segments are coordinated by a higher-level data structure called a "result table" or "table." When new rows of the query result are received from the row source, the table adds each to the appropriate segment based on its key value.

The table manages the amount of memory consumed to represent the result set by determining the level of row data information that each segment maintains for its rows. Each segment can be either a full information table segment ("full segment"), a partial information table segment ("partial segment"), or a minimal information table segment ("minimal segment"), indicating the level of row data information being retained in the segment for each of the subrange of rows contained by the segment. Full segments contain complete row information for the rows they contain, and may be used to immediately respond to requests for row data received by the table from the row sink. Partial and minimal segments, on the other hand, each contain progressively smaller portions of the row data, and may not be used to immediately respond to row data requests from the row sink. Rather, when the table receives a row data request for a row that is contained in a partial or minimal segment, the partial or minimal segment is converted to a full segment by retrieving row data for each of the contained rows from the row source. The row data request may then be serviced from this new full segment. Partial segments preferably contain only the row information necessary to efficiently re-retrieve the remainder of the row data from the row source. This information is termed a "bookmark."

In some cases, however, partial segments also contain pieces of information among the row data that would be expensive for the row source to recreate, in terms of either response time or processing resources consumed, even using the bookmark. For example, it would be expensive for the row source to recalculate even a few values for a calculated "percentage of total" column determined by, for a particular row, dividing a particular value in the row data for that row by the sum of that value with all of the other rows in the source table. Since determining this percentage requires examining every row in the source table, such a column might therefore be retained with each row's embodiment in partial segments instead of being discarded with the rest of the row data for each row.

In contrast, minimal segments contain no row data for individual rows, but rather contain only a counter indicating the number of rows represented by the minimal segment, and indications of the highest and lowest key values for the rows represented by the minimal segment. In order to convert a minimal segment to a full segment, the original query is generally resubmitted to the row source, limited to return only the row data for the rows between the first and last key values for the minimal segment. In order to control the amount of memory consumed by the facility to represent the result set, the table preferably monitors the amount of memory consumed, and, when it exceeds a certain limit, reduces the amount of memory consumed by converting one or more full segments into partial segments, and/or converting one or more partial segments into minimal segments. To limit the processing resources required to convert segments between different types, the size of segments is limited by splitting an individual full segment into multiple full segments when it reaches a maximum number of rows.

The facility is preferably implemented in software, as a set of class definitions. The classes that embody the facility include a Table class for objects that each represent one table, containing one result set, and a Segment class for objects that each represent one segment, which can represent a subset of the rows of the result set. The Table class preferably defines a method for a row source to invoke to provide rows of the result set, methods for a row sink to invoke to request rows of the result set, and a method for segments to invoke to check and adjust the consumption of memory by the facility. Three classes derived from the Segment class each correspond to a different type of segment containing a different level of information. These derived classes include a FullSegment class for objects that represent full segments, a PartialSegment class for objects that represent partial segments, and a MinimalSegment class for objects that represent minimal segments. Each of the classes derived from the Segment class preferably defines methods for the table to invoke: to add rows to those represented by the segment, to retrieve row data for rows represented by the segment, and to reduce the amount of memory consumed by the segment by converting it to a segment containing less information.

DETAILED DESCRIPTION OF THE INVENTION

Overview

Figure 1:
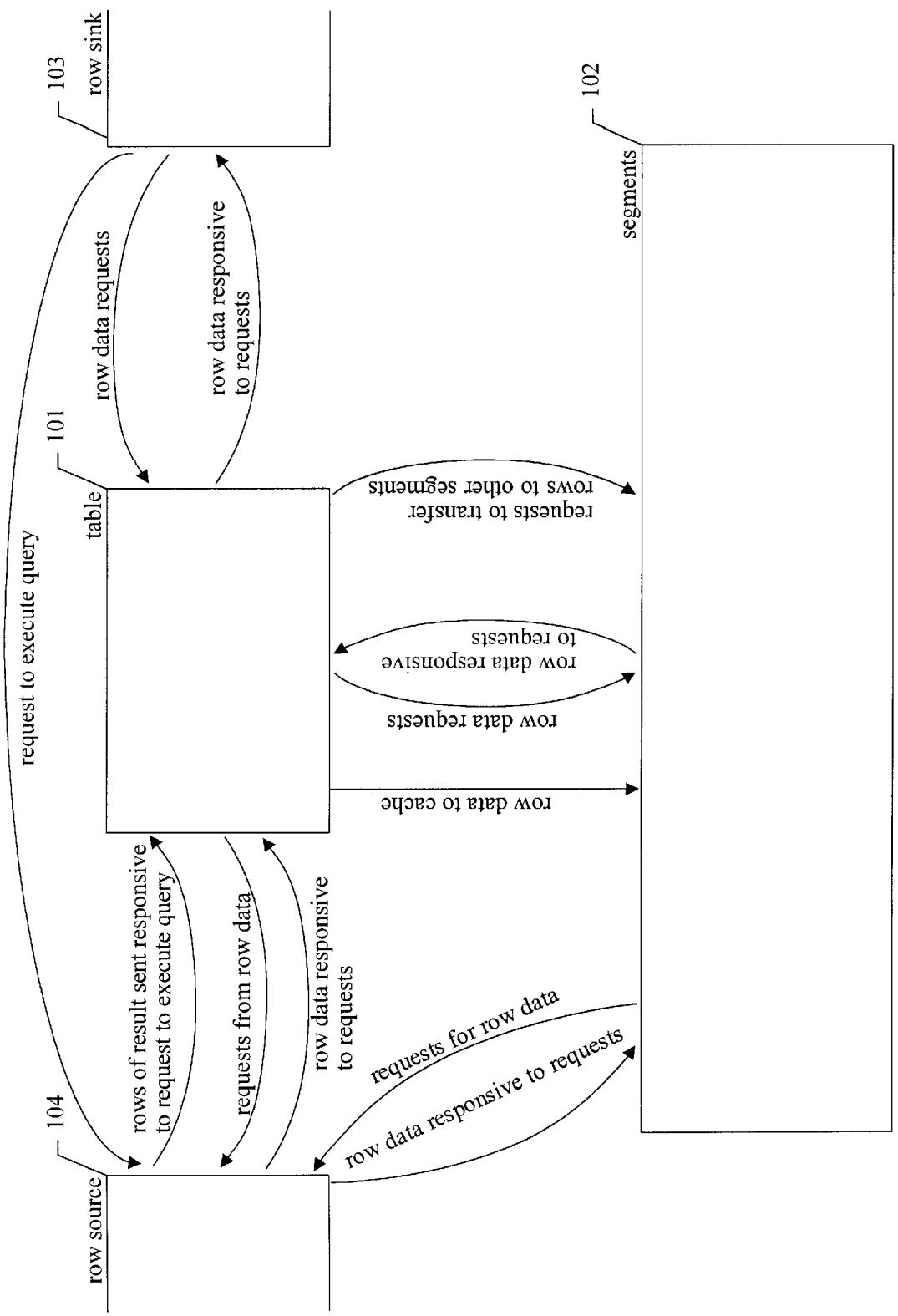
FIG. 1 is an overview diagram showing the interactions between the table objects and the segment objects and interactions with external objects.

A method and system for effectively representing query results in a limited, user configurable amount of memory is provided. At a high level, the invention divides the rows of a query result into a number of groups, and maintains complete row data for the rows of only those groups containing rows whose row data is likely to be retrieved. By maintaining complete data for the groups containing rows whose row data is likely to be retrieved, the invention can quickly service requests to return row data for these rows. By declining to maintain complete row data for rows in other groups, the invention reduces the size of its representation of the query result, thereby conserving memory.

In a preferred embodiment, the facility manages the results of a database query obtained from a row source program, such as a database engine, for access by a row sink program, such as a database front end. The facility further divides the ordered rows into a number of subsets, called "table segments" or "segments," that each contain the rows whose keys fall within a distinct subrange of key values. The segments are coordinated by a higher-level data structure called a "result table" or "table." When new rows of the query result are received from the row source program, the table adds each to the appropriate segment based on its key value.

The table manages the amount of memory consumed to represent the result set by determining the level of row data information that each segment maintains for its rows. Each segment can be either a full segment, a partial segment, or a minimal segment, indicating the level of row data being retained in the segment for each of the subrange of rows contained by the segment. Full segments contain complete row data for the rows they contain, and may be used to immediately respond to requests for row data received by the table from the row sink program. Partial and minimal segments, on the other hand, each contain progressively smaller portions of the row data, and may not be used to immediately respond to row data requests from the row sink program. Rather, when the table receives a row data request for a row that is contained in a partial or minimal segment, the partial or minimal segment is converted to a full segment by retrieving row data for each of the contained rows from the row source program. The row data request may then be serviced from this new full segment. Partial segments preferably contain only the row data necessary to efficiently re-retrieve the remainder of the row data from the row source program. This information is termed a "bookmark."

In some cases, in addition to bookmarks, partial segments also contain pieces of information among the row data that would be expensive for the row source program to recreate, in terms of either response time or processing resources consumed, even using the bookmark. For example, it would be expensive for the row source program to recalculate even a few values for a calculated "percentage of total" column determined by, for a particular row, dividing a particular value in the row data for that row by the sum of that value with all of the other rows in the source table. Since determining this percentage requires examining every row in the source table, such a column might therefore be retained with each row's embodiment in partial segments instead of being discarded with the rest of the row data for each row.

In contrast, minimal segments contain no row data for individual rows, but rather contain only a counter indicating the number of rows represented by the minimal segment, and indications of the highest and lowest key values for the rows represented by the minimal segment. In order to convert a minimal segment to a full segment, the original query is generally resubmitted to the row source program, limited to return only the row data for the rows between the first and last key values for the minimal segment. In order to control the amount of memory consumed by the facility to represent the result set, the table preferably monitors the amount of memory consumed, and, when it exceeds a certain limit, reduces the amount of memory consumed by converting one or more full segments into partial segments, and/or converting one or more partial segments into minimal segments. To limit the processing resources required to convert segments between different types, the size of segments is limited by splitting an individual full segment into multiple full segments when it reaches a maximum number of rows.

The facility is preferably implemented in software, as a set of class definitions. The classes that embody the facility include a Table class for objects that each represent one table, containing one result set, and a Segment class for objects that each represent one segment, which can represent a subset of the rows of the result set. The Table class preferably defines a method for a row source program to invoke to provide rows of the result set, methods for a row sink program to invoke to request rows of the result set, and a method to check and adjust the consumption of memory by the facility. Three classes derived from the Segment class each correspond to a different type of segment containing a different level of information. These derived classes include a FullSegment class for objects that represent full segments, a PartialSegment class for objects that represent partial segments, and a MinimalSegment class for objects that represent minimal segments. Each of the classes derived from the Segment class preferably defines methods for the table to invoke to: add a row to those represented by the segment, retrieve row data for rows represented by the segment, and transfer rows to another segment in order to split or convert the segment to another type. Full segments may be converted to partial segments and partial segments to minimal segments in order to reduce the amount of memory that they consume, and partial and minimum segments may be converted to full segments in order to service requests for row data for rows that they represent.

FIG. 1 is an overview diagram showing the interactions between the table objects and the segment objects and interactions with external objects. FIG. 1 shows a table object 101, segment objects 102, a row sink program 103, and a row source program 104. The row source program 104 may be any program capable of providing a result set comprised of rows. Such programs may include database engines, file systems, and spreadsheet programs, in which rows represent database records, files, and spreadsheet rows, respectively. The row sink program 103 may be any program for requesting and receiving row data for specific rows of a row set. Such programs include database front-end applications, as well as other programs for processing row data. Initially, the row sink program submits to the row source program a request to execute a database query. Either the row sink program 103 or the row source program 104 additionally creates the table object 101 and the segment objects 102. In response to the request to execute the query, the row source program provides to the table object the rows of the results produced by executing the query. The table object subsequently receives requests from the row sink program for the row data for particular rows of the result set. The table object responds to these row data requests by providing the requested row data to the row sink program.

When the table object receives rows of the result set from the row source program, it passes the row data to the segment objects. As is discussed in greater detail below, the row data is passed to a particular segment object based upon a key value within the row data. When the table object subsequently receives row data requests from the row sink program, the table object first determines which of the segment objects represents the requested rows. If the segment object representing the requested rows is a full segment object containing complete row information for its rows, the table object submits a row data request to the segment requesting the rows specified by the row sink program. In response to the request from the table object, the full segment object provides the requested row data. When the complete row data for a requested row is contained in one of the segment objects, this segment object satisfies row data requests from the table object by merely returning this complete row data. At various times, however, the table object reduces the size of particular full segment objects by discarding at least a portion of their row data. If the table object receives a row data request from the row sink program for a row managed by a segment object whose size has been reduced by discarding row data, the table causes the segment object to re-retrieve this row data from the row source program. Complete row data for all the rows managed by such a segment object is generally re-retrieved from the row source program at this time. Row data not discarded by the segment object is used, where available, to enable the row source program to provide the requested row data to the segment object in an efficient manner.

Figure 2:
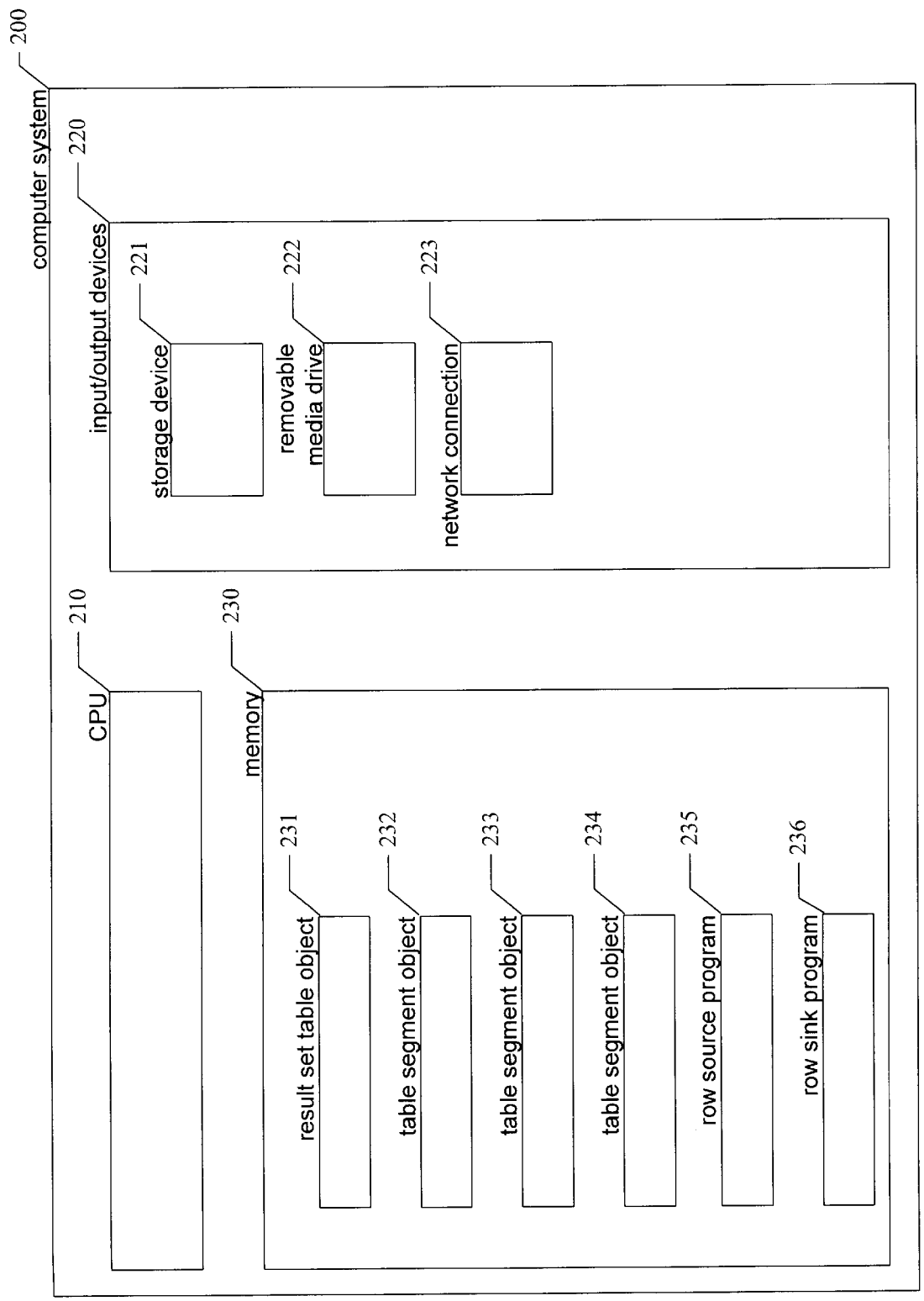
FIG. 2 is a high-level block diagram of the general-purpose computer system upon which the facility preferably operates.

FIG. 2 is a high-level block diagram of the general-purpose computer system upon which the facility preferably operates. The computer system 200 contains a central processing unit (CPU) 210, input/output devices 220, and a computer memory (memory) 230. Among the input/output devices is a storage device 221, such as a hard disk drive. The input/output devices also include a removable media drive 222, which can be used to install software products, including the facility, which are provided on a computer-readable medium, such as a CD-ROM. The input/output devices further include a network connection 223, through which the computer system may be connected to other computers via a network. Such networks include, but are not limited to, private local area networks, private wide area networks, and the Internet. The memory preferably contains the programmatic objects that comprise the facility, as well as the external programs with which the facility interacts. The memory contains one result set table object ("table object") 231, and a number of segment objects, e.g., 232, 233, and 234. The memory further contains a row source program 235 preferably for providing row data for rows of the query result and a row sink program 236 for requesting row data from the table object. In alternative embodiments, the row source program and/or the row sink program reside and execute on separate computer systems connected to the computer system 200 via the network connection (not shown). While the facility is preferably implemented on a computer system configured as described above, those skilled in the art will recognize that it may also be implemented on computer systems having different configurations.

EXAMPLE

In order to illustrate the present invention, it is discussed herein with reference to a small, simple sample result set. Those skilled in the art will recognize that the invention may be gainfully applied to much larger and more complex result sets.

Figure 3:
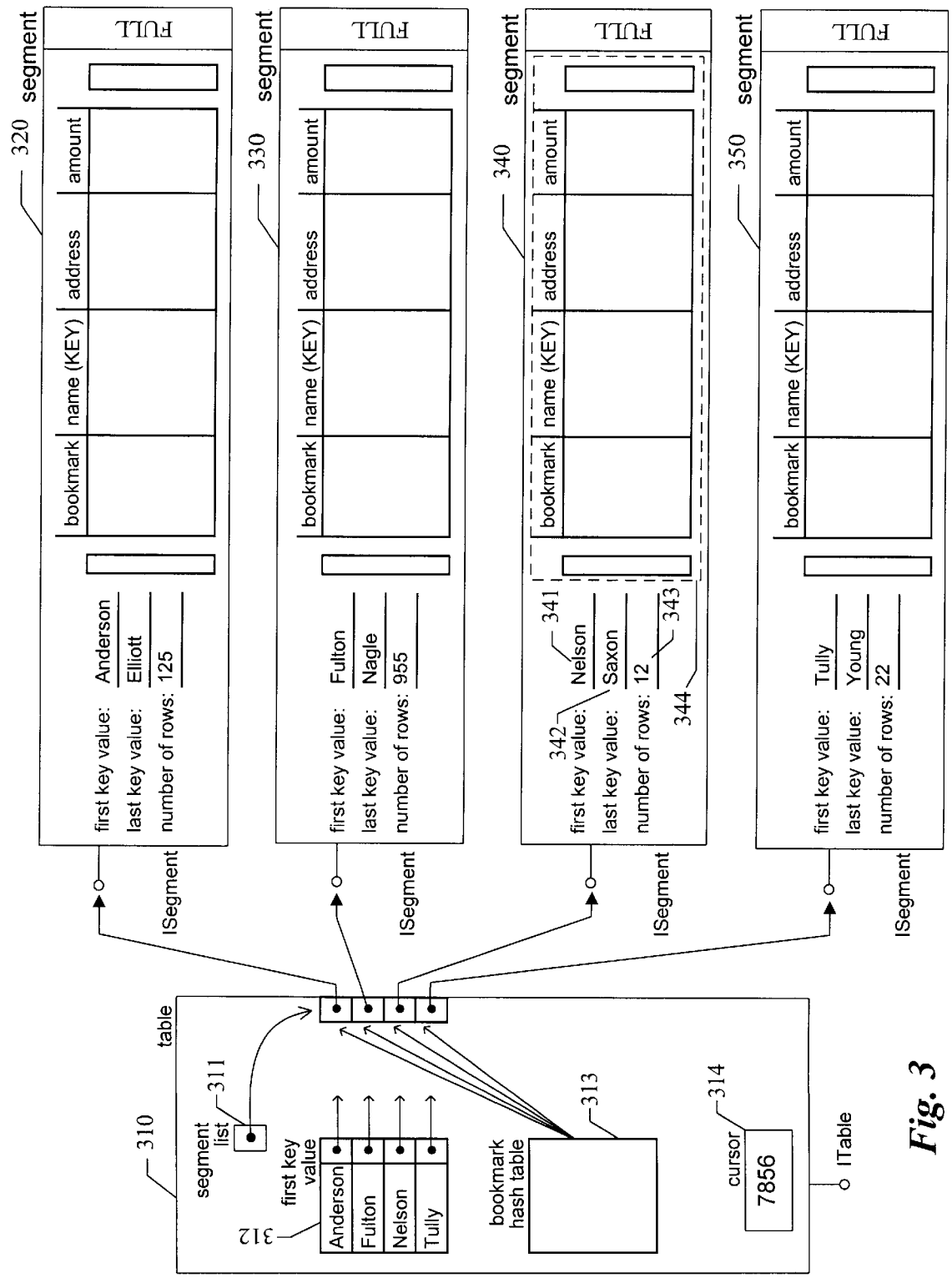
FIG. 3 is a table object and segment object diagram showing an overview of the initial state of the facility in managing the sample result set.

FIG. 3 is a table object and segment object diagram showing an overview of the initial state of the facility in managing the sample result set. FIG. 3 shows that the facility has instantiated one table object 310 and four segment objects 320, 330, 340, 350 to manage the sample result set. The table object is of class Table object, and implements the ITable interface, discussed further below. The segment objects are each of a class that is derived from the Segment class, and the segment objects each implement the ISegment interface, discussed further below. As can be seen from their labels, all four segment objects shown in FIG. 3 are full segment objects, and therefore contain complete row data for the rows of the result set that they represent. For example, segment object 340 contains row data 344. Among the row data is a key value for each row that determines the row's position in the sorted result set. Each segment object corresponds to a particular subrange within the overall range of key values for the result set. For example, segment object 340 contains rows from a first key value 341 of "Nelson" to a last key value 342 of "Saxon." Segment object 340 further has a row count 343 of twelve.

In the table object, pointers to the segment objects are arranged in a segment object list 311 in the order of their key subranges within the key range for the result set. For example, a pointer to segment object 320, corresponding to the key subrange from "Anderson" to "Elliott" precedes in the segment object list a pointer to segment object 330, which corresponds to the key subrange from "Fulton" to "Nagel." The segment object list is preferably a linked list, to which pointers to segments may be added and from which pointers to segments may be removed without revising the entire segment object list. The table object also contains a first key value table object 312 that maps from the first key value in each segment object's key subrange to the pointer to that segment object. The first key value table object is used to determine the segment object to which a row newly received from the row source program is added. The table object preferably further contains a bookmark hash table 313, which maps a bookmark to the segment object containing the row having that bookmark. The concept of hash tables and various effective implementations thereof are well known to those skilled in the art. In an alternative embodiment, to reduce memory requirements, bookmark hash table 313 is omitted from the table object, and the table object queries the segment objects in turn to identify the segment containing a row having a particular bookmark. To facilitate this process, in accordance with the alternative embodiment, each segment supports a ContainsBookmark method that, when invoked on the segment, indicates whether the segment contains a row having the specified bookmark. The table object further contains a cursor position bookmark 314 that identifies a position within the sorted result set, and is used to return rows sequentially in key value order to the row sink program.

Figure 4:
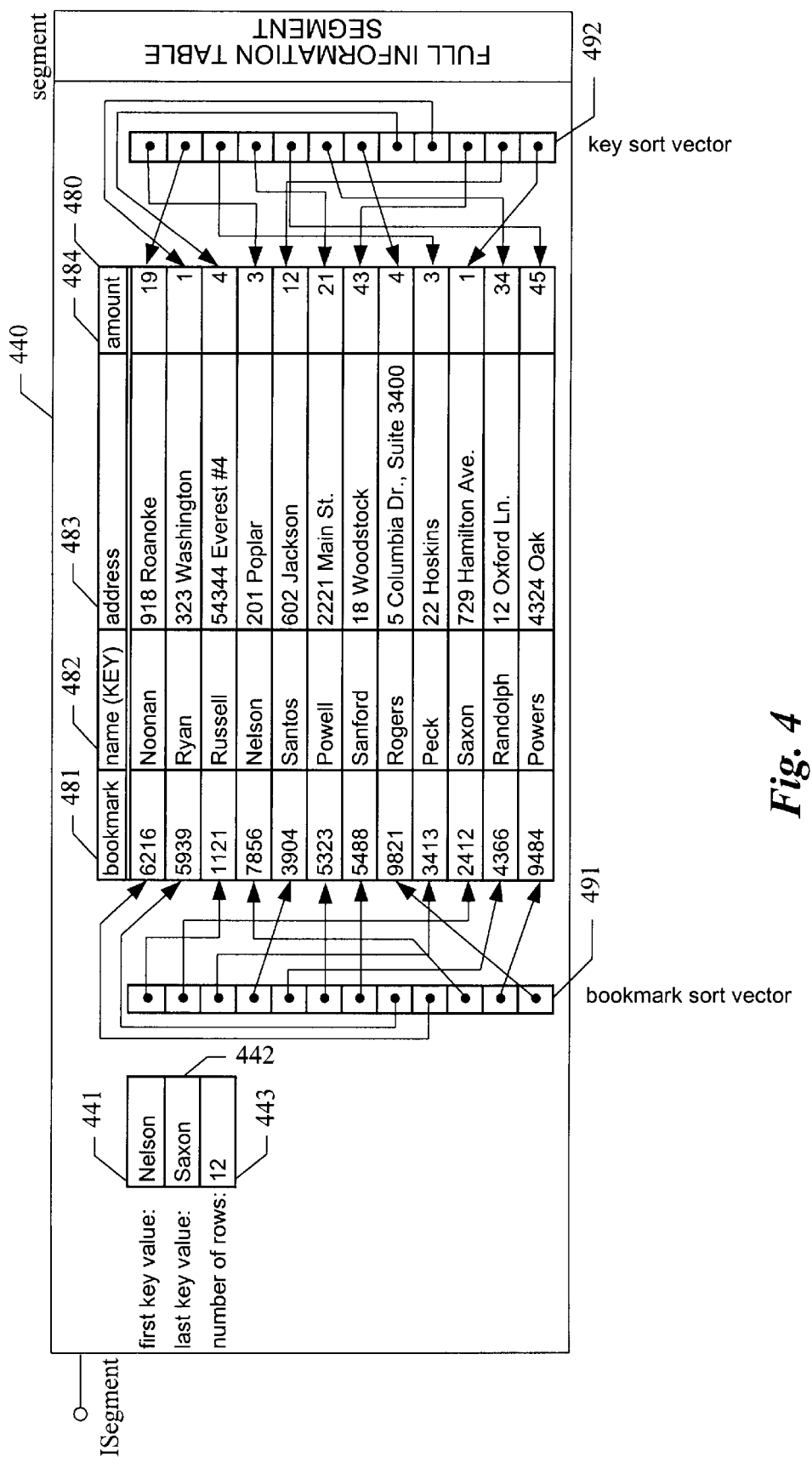
FIG. 4 is a segment object diagram showing the contents of segment 340 in greater detail.

FIG. 4 is a segment object diagram showing the contents of segment object 340 in greater detail. Segment object 440 is a full segment object and therefore contains complete information for each of its rows, including a bookmark sort vector 491 and key sort vector 492 used to identify the different orders for traversing the row data. The row data is arranged in a row store 480. In one preferred embodiment, variable-length information for the rows is stored in a different area of the segment than fixed-length information for the rows (not shown). Row data for a newly added row is appended to the end of the row store. Each row in the row store is divided into a number of columns: a bookmark column 481 contains the bookmark for a row, which may be used by the row source program to quickly re-retrieve row data for the row; a key column 482 contains the primary key for sorting rows in the result set; and additional data columns 483 and 484 each contain further information relating to each row. The bookmark sort vector contains a pointer to each of the rows in the row store. The pointers are arranged in the same order as bookmarks for the rows, so that, when the bookmark sort vector is traversed from top to bottom, the bookmark of each row pointed to is larger than the bookmark of the previously visited row. The key sort vector performs the same function with respect to key values instead of bookmarks.

Figure 5:
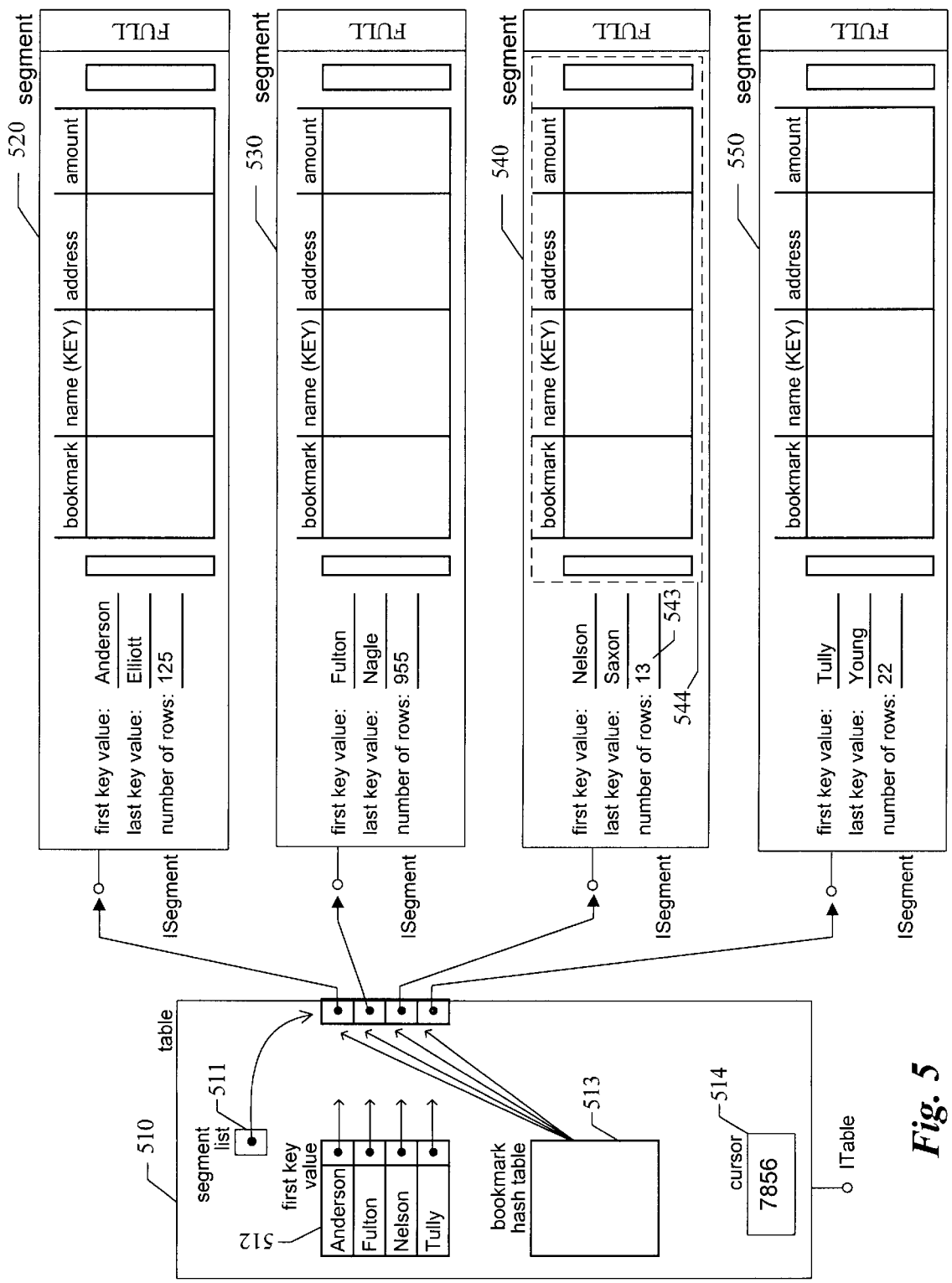
FIG. 5 is a table object and segment object diagram showing the addition of a row to the table object.

FIG. 5 is a table object and segment object diagram showing the addition of a row to the table object. When the facility has the state shown in FIG. 3, a new row is received from the row source program having the key value "Neville." The table object receives the row data for this row and identifies the segment object to which the row is to be added. To do so, the table object traverses down the first key value table object until it reaches the last segment object having a first key value that is less than or equal to the key value of the new row, in this case, "Nelson" of segment object 540. A mapping is then added to the hash table 513 to map from the new row's bookmark to the identified table.

Figure 6:
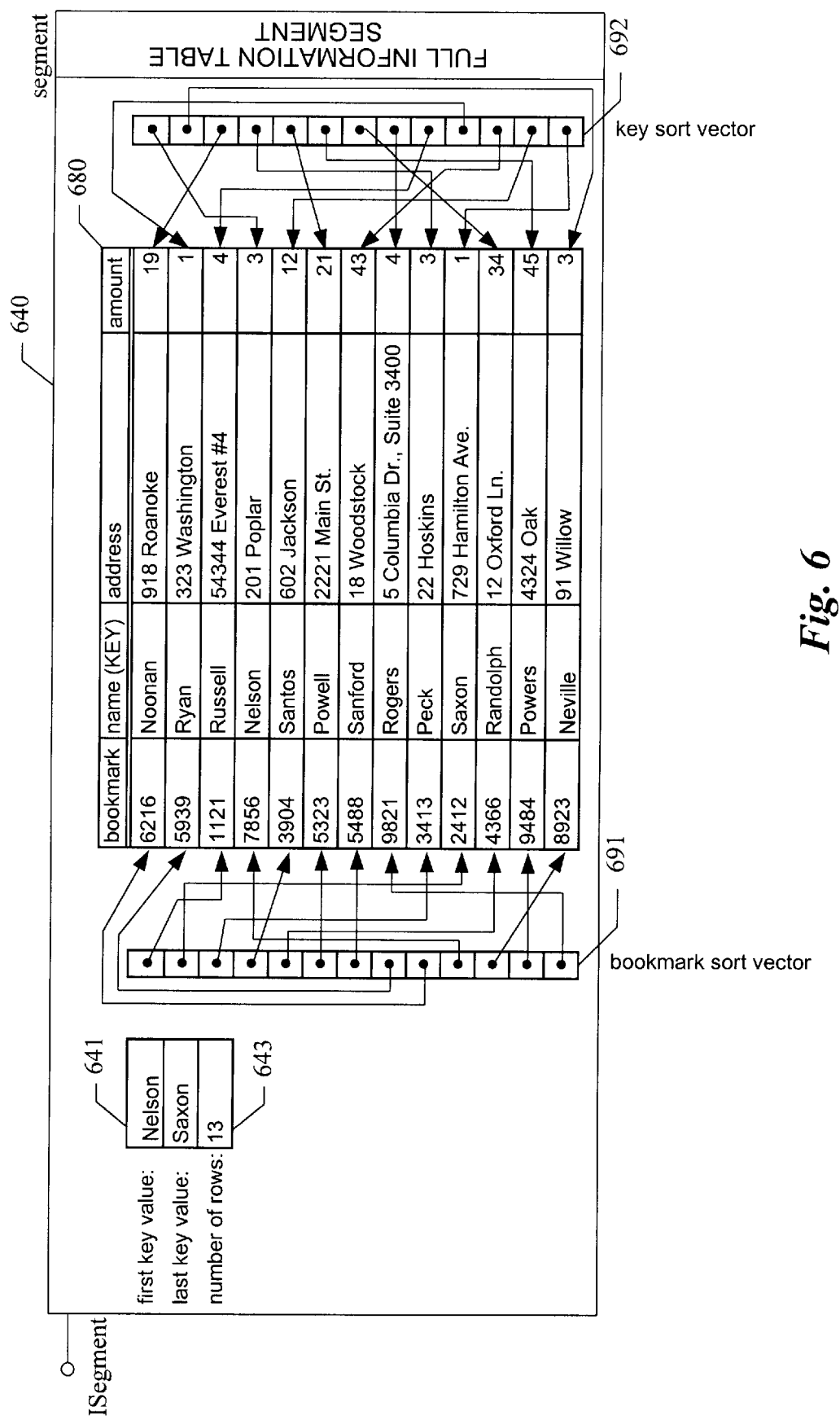
FIG. 6 is a segment diagram showing the addition of a new row to full segment object 540.

FIG. 6 is a segment object diagram showing the addition of a new row to full segment object 540. FIG. 6 shows that row data for the new row has been added to the end of the row store 680. FIG. 6 further shows that pointers have been added in the appropriate positions to the bookmark sort vector 691 and the key sort vector 692 pointing to the row data for the new row. The bookmark sort vector shows that the bookmark for the new row sorts to eleventh of thirteen bookmarks, while the key sort vector shows that the key of the new row sorts to second of thirteen keys. FIG. 6 further shows that the number of rows 643 has been increased from 12 to 13 to reflect the addition of the new row, which is also reflected in row count 543.

Figure 7:
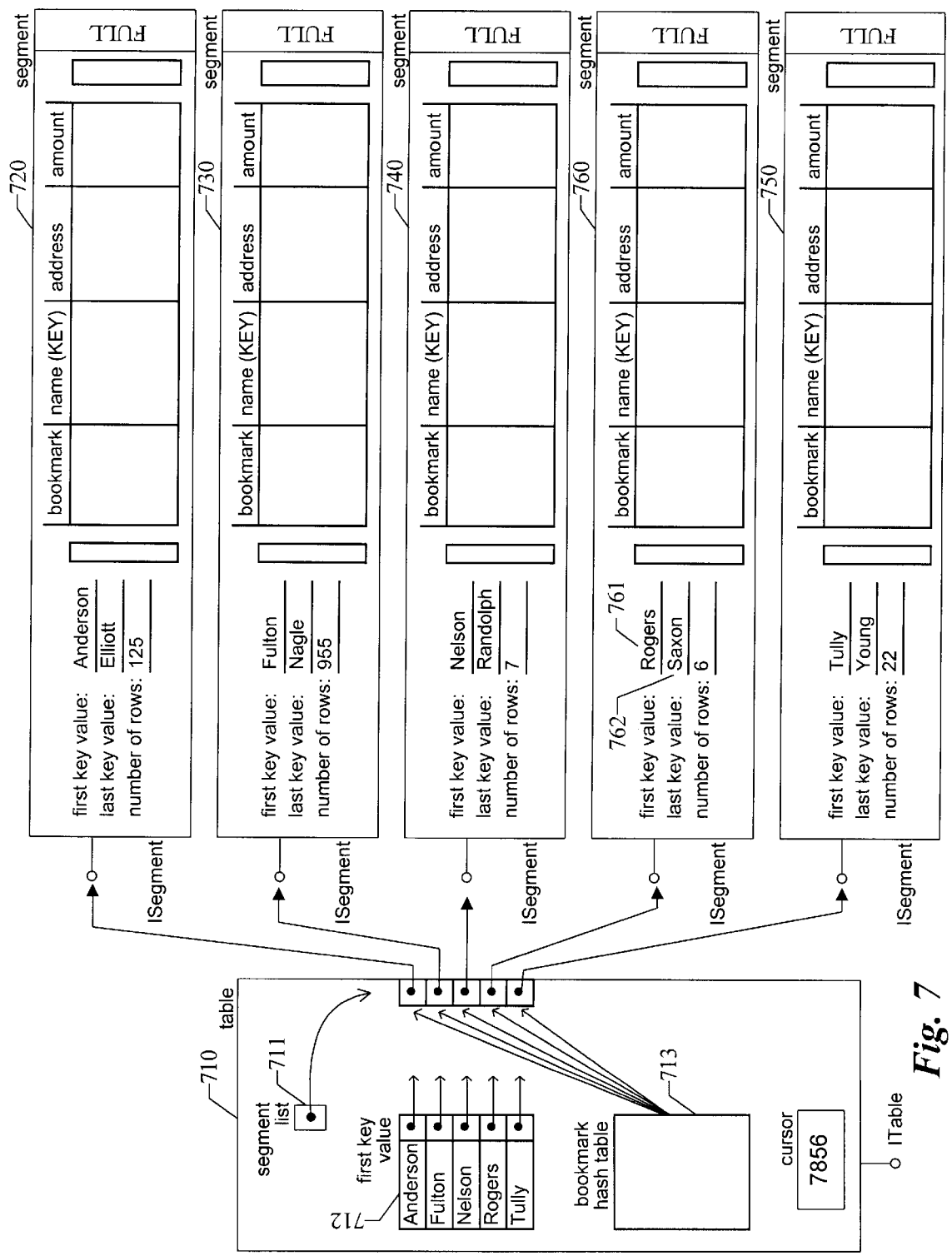
FIG. 7 is a table and segment diagram showing the division of a single full segment object into two separate full segment objects.

The facility preferably limits the number of rows represented by a single segment object in order to control the maximum amount of memory consumed by each segment object, especially when the segment is a full segment, and the maximum amount of processing resources required to convert a segment object between different types. FIGS. 5 and 6 discussed above illustrate the process of adding a row to a segment object in cases in which the number of rows in the segment object is less than a maximum number of rows. If, however, a row is added to a segment object when the segment object already has the maximum number of rows, that segment object is divided into two or more separate segment objects. FIG. 7 is a table object and segment object diagram showing the division of a single full segment object into two separate full segment objects. FIG. 7 shows that the segment object 540 (FIG. 5) has been divided into two separate segment objects, segment object 740 and segment object 760. It should be noted that the maximum number of rows for a segment object would typically be set much higher than the thirteen rows of segment object 540, but that a small segment object has been selected for this example to more clearly illustrate the process of dividing a full segment object. Segment object 740 represents seven of the original 13 rows, with key values "Nelson" through "Randolph." Segment object 760 contains the remaining six of the original 13 rows, from key value "Rogers" through key value "Saxon." A pointer to the new segment object 760 has been added to the segment object list 711 and the first key value of segment object 760 has been added to the first key value table object 712, and the bookmark hash table 713 has been updated to reflect the transfer of the moved rows.

Figure 8:
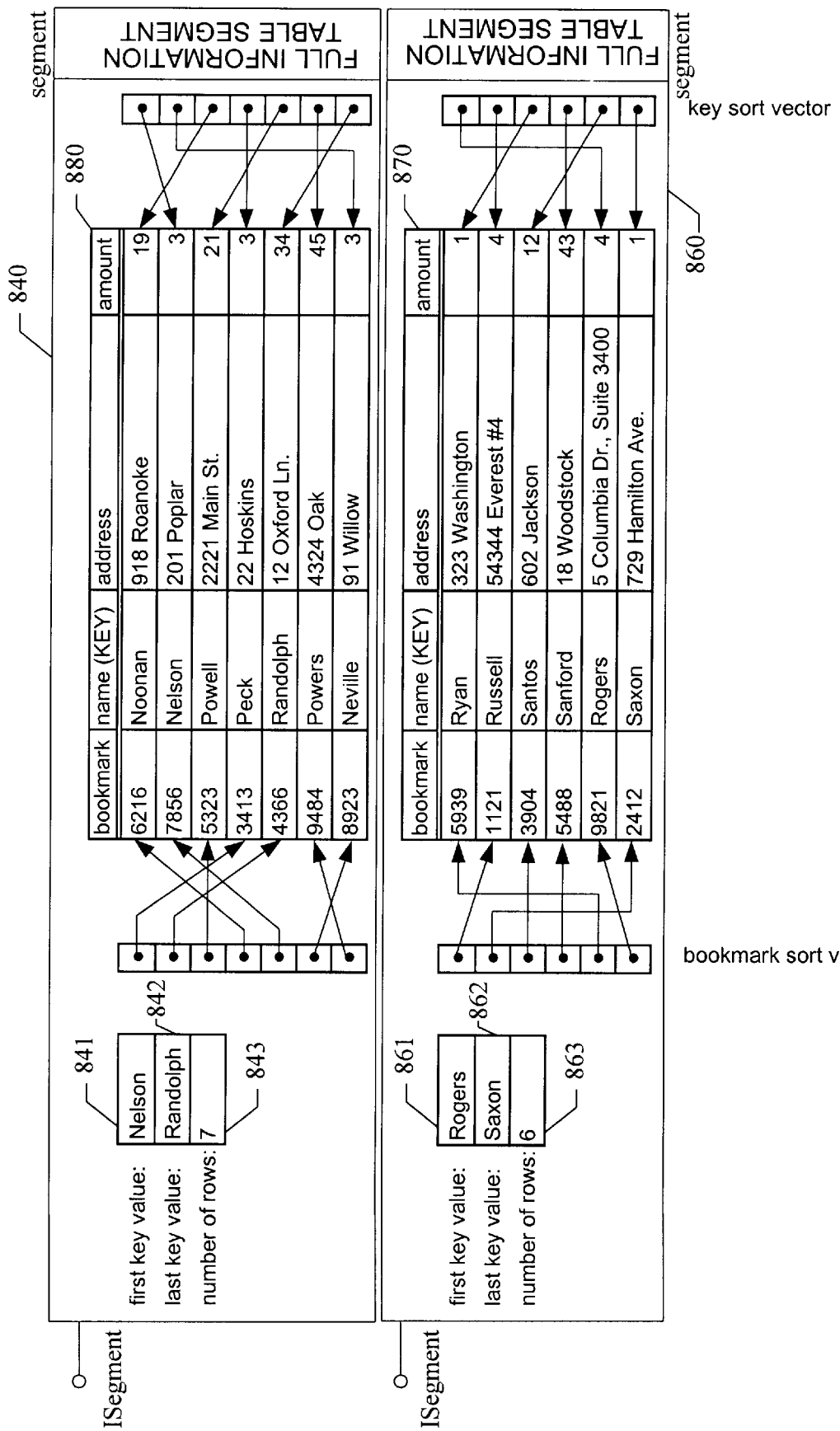
FIG. 8 is a segment diagram showing the two segment objects into which segment object 540 was divided in greater detail.

FIG. 8 is a segment object diagram showing the two segment objects into which segment object 540 was divided in greater detail. It can be seen from FIG. 8 that original segment object 540 was divided roughly in half to form the segment objects 840 and 860. If the row source program were providing new rows in increasing key order, however, the original table object 540 would have preferably instead divided itself into a first new segment object containing all the rows of the old segment object and the second new segment object containing only the new row, as it is expected that subsequent rows would have key values larger than the new row, and would therefore be added to the second new segment object. This feature, while not depicted in the figures, is nonetheless part of the present invention.

Figure 9:
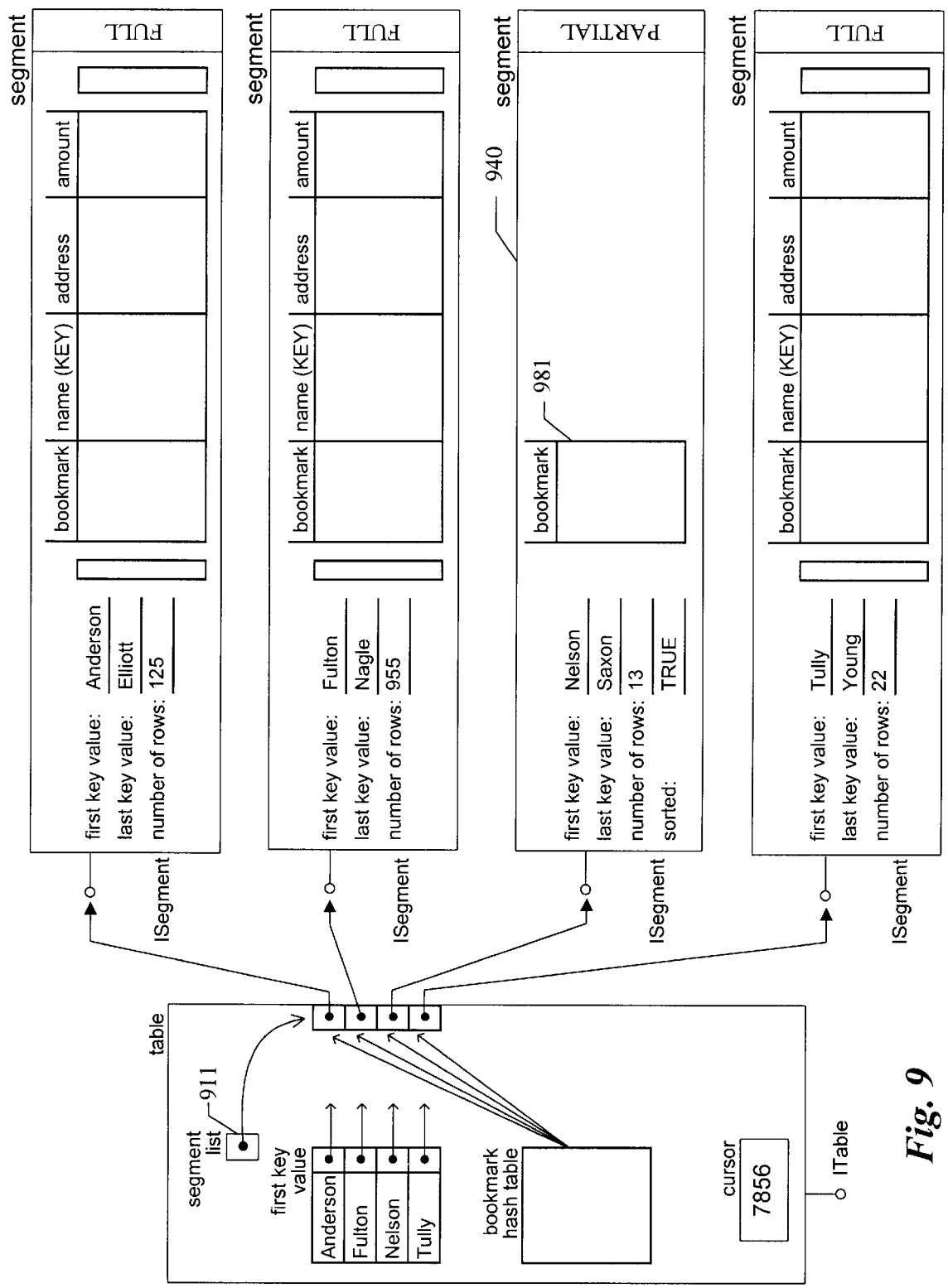
FIG. 9 is a table object and segment object diagram showing the conversion of a full segment object to a partial segment object.

FIG. 9 is a table object and segment object diagram showing the conversion of a full segment object to a partial segment object. In order to reduce the total amount of memory consumed to represent a result set, the facility converts eligible full segment objects to partial segment objects by discarding the row data for each row except for the bookmark. FIG. 9 shows the replacement of full segment object 540 (FIG. 5) with partial segment object 940 as the result of the conversion of this full segment object to a partial segment object. It can be seen from FIG. 9 that all the row data 544 of the full segment object 540 (FIG. 5) has been discarded except for the bookmark column 981.

Figure 10:
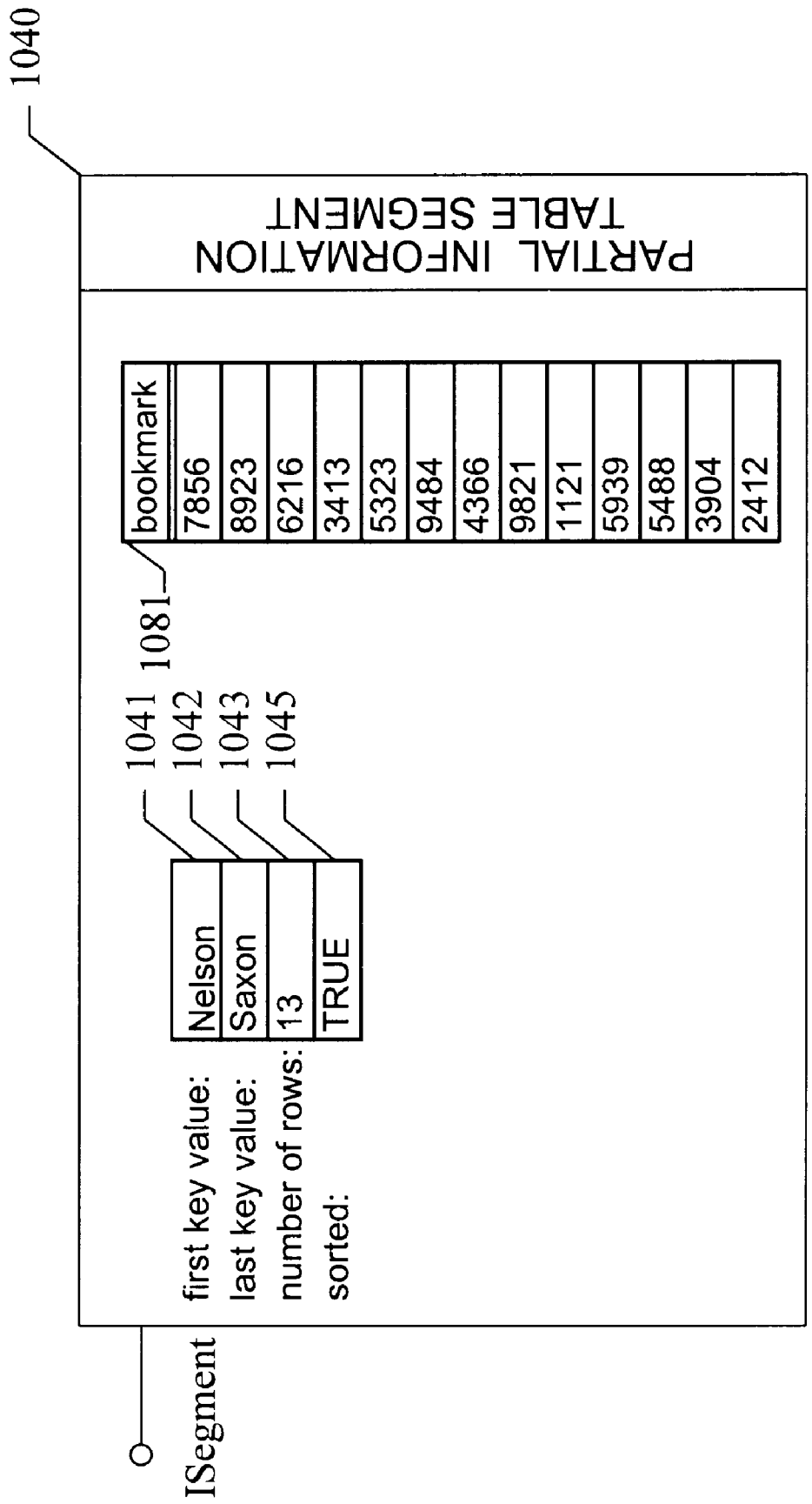
FIG. 10 is a segment object diagram showing the partial segment object that has been converted from a full segment object in greater detail.

FIG. 10 is a segment object diagram showing the partial segment object that has been converted from a full segment object in greater detail. FIG. 10 shows that the partial segment object 1040 contains only the following: a first key value 1041, a last key value 1042, a row counter 1043, a sorted flag 1045, and a bookmark column 1081. The bookmark column 1081 contains a list of the bookmarks of each of the rows represented by the segment object. This list is sorted in increasing key value. The value of the sorted flag 1045 ("TRUE") indicates that this sorted order of the bookmarks has been so far maintained. However, if additional rows are later added to the partial segment object, their bookmarks will merely be appended at the end of the list, as, without the key values for the rows already in the partial segment object, it is impossible to determine where in the key order the new row falls. The sorted flag will therefore be set to FALSE when further new rows are added to the partial segment object if the new row's key value is less than the last key value. If row data is later requested for rows in the partial segment object 1040, the partial segment object will be converted back to a full segment object by, for each bookmark in the bookmark list 1081, requesting the complete row data for the row having that bookmark from the row source program.

Figure 11:
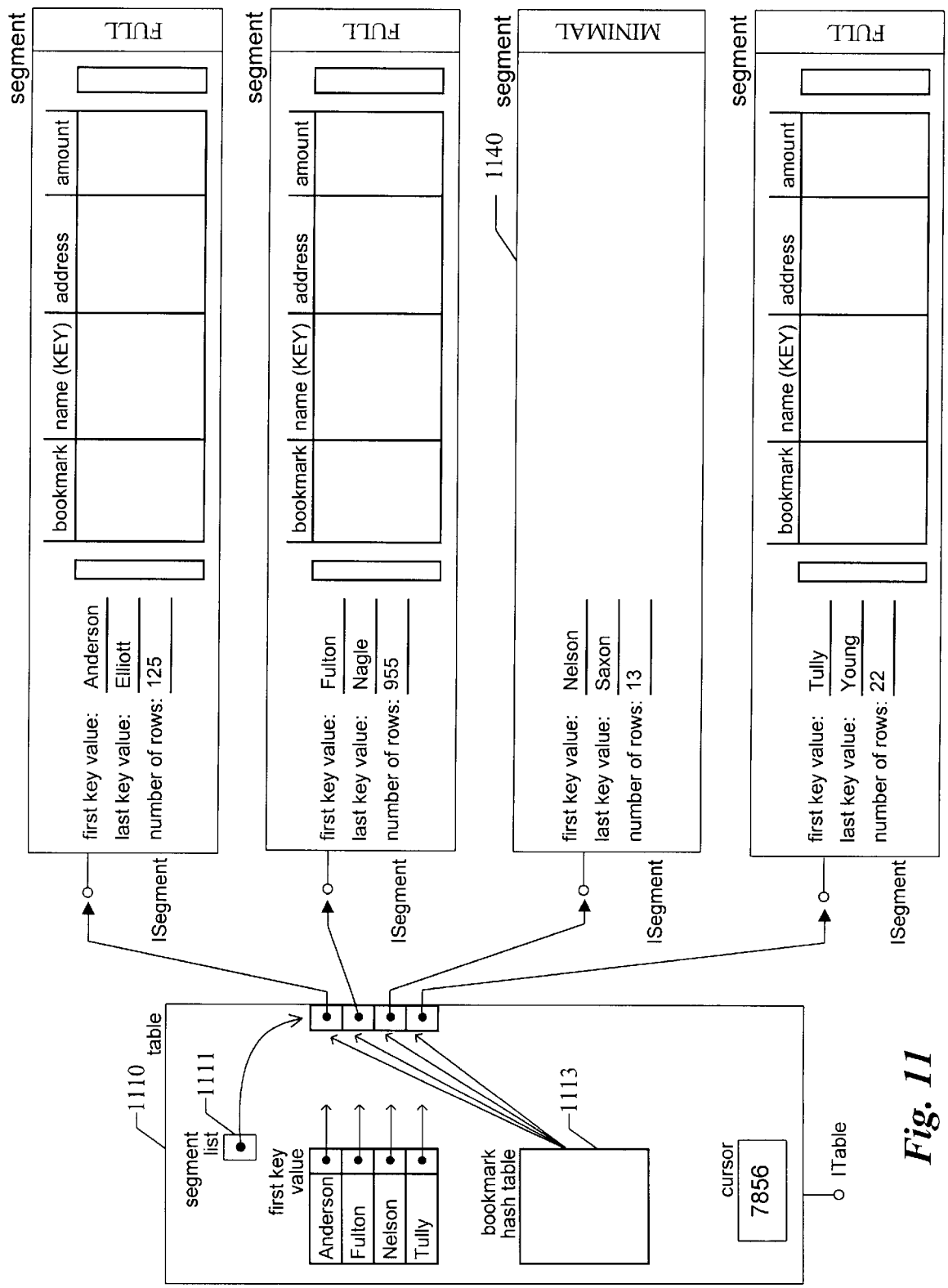
FIG. 11 is a table object and segment object diagram showing a conversion of a partial segment object to a minimal segment object.

FIG. 11 is a table object and segment object diagram showing a conversion of a partial segment object to a minimal segment object. The facility converts one or more partial segment objects to minimal segment objects in order to reduce the total amount of memory consumed to represent a result set at a point after all eligible full segment objects have been converted to partial segment objects. While performing this conversion can prove expensive if a row retrieval request is subsequently received for this segment, requiring the minimal segment to be converted to a full segment by repeating the query, it enables the facility to continue operating and representing the query result set for result sets that are especially large relative to the prescribed amount of memory for containing the result set. The facility preferably also converts full or partial segment objects to minimal segment objects in the following special situations: First, when the row sink program has specified in the query that row data will only be retrieved using a "forward-only cursor" that can only be advanced in a forward direction through the table object to return row data, segment objects that come before the segment object containing the present cursor position are converted to minimal segment objects, as their row data will not be retrieved in the future. Second, in cases where the query submitted by the row sink program specifies that only a specified number of rows at the beginning or end of the key-value-ordered table will be retrieved, segment objects that do not contain any of those rows may be immediately converted to minimal segment objects, as their row data will never be retrieved. FIG. 11 shows the replacement of a partial segment object 940 (FIG. 9) with a minimal segment object 1140 as the result of the conversion of the partial segment object to a minimal segment object.

Figure 12:
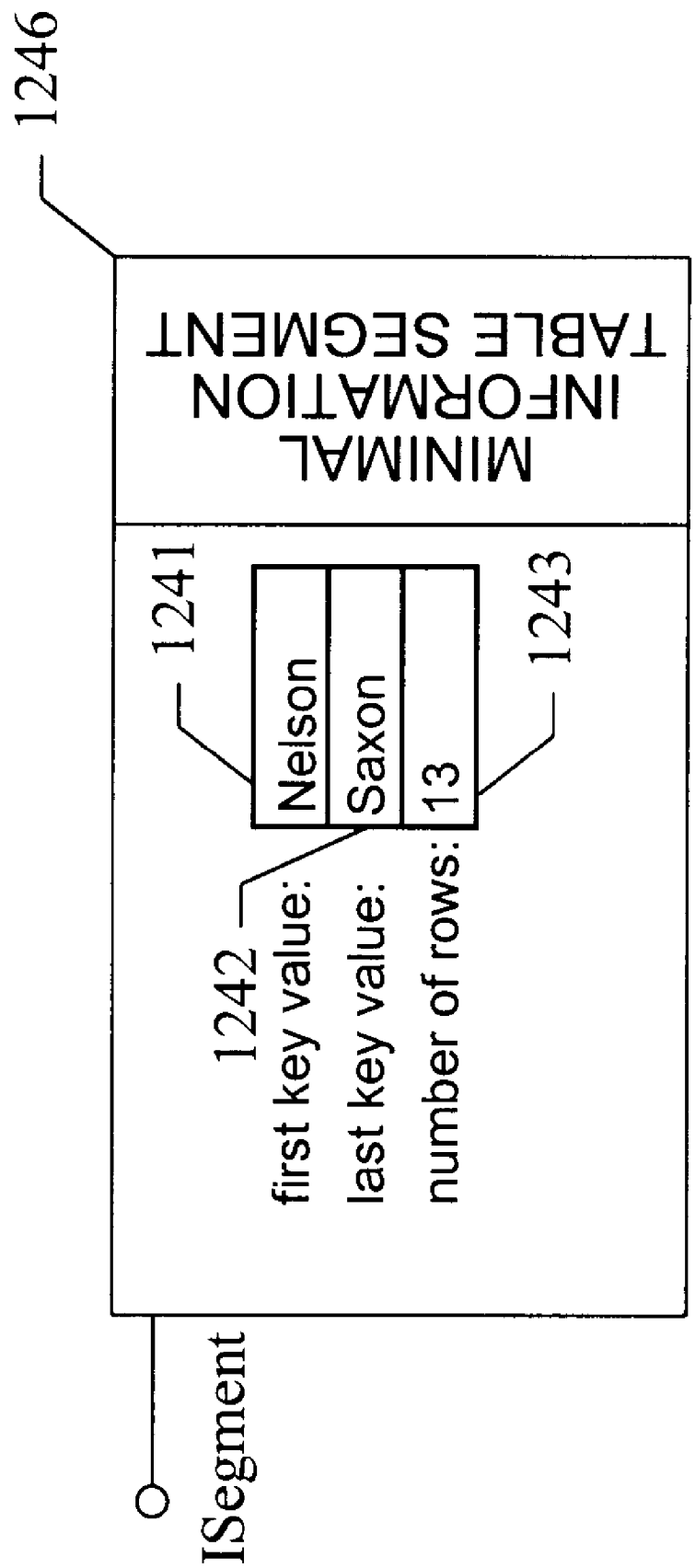
FIG. 12 is a segment object diagram showing the contents of a minimal segment object.

FIG. 12 is a segment object diagram showing the contents of a minimal segment object. The minimal segment object 1240 contains only a first key value 1241, a last key value 1242, and a row counter 1243. As a result of the conversion from partial information table object segment object 1040 (FIG. 10), sorted flag 1045 and bookmark list 1081 have been discarded to reduce the memory consumed by the segment object. If new rows are later added to the minimal segment object, the number of rows 1243 will be incremented, and the first key value 1241, the last key value 1242, or both will be adjusted if necessary. If rows are later retrieved from the minimal segment object, the minimal segment object will first be converted to a full segment object by reexecuting the original query submitted by the row sink program to return row data for result rows between the first key value 1241 and the last key value 1242.

In addition to adding new rows to the result set by invoking the PutRow method of the table object, the row source program may additionally remove and modify rows previously added to the result set by invoking corresponding methods of the table object (not shown). These methods of the table object preferably identify the segment representing the row to be removed or modified, and invoke on that segment a corresponding method to remove or modify the row (not shown).

The facility may preferably be configured to operate in either a synchronous mode or an asynchronous mode. In the synchronous mode, the facility executes only (A) initially in response to the receipt of a batch of PutRow invocations by the row source program representing the entire query result set, then (B) in response to row retrieval invocations by the row sink program. On the other hand, in the asynchronous mode, portions of the facility may execute after the initial receipt of rows from the row source program and between row retrieval invocations by the row sink program. Among other advantages, the asynchronous mode facilitates the representation by the facility of "dynamic query result sets," which the row source may periodically update by adding additional rows or deleting existing rows. (In order to so add a row, the row source program invokes the same PutRow method of the table used to initially add rows to the result set, discussed below. In order to delete a row, the row source program preferably invokes a DeleteRow method of the table.) When operating in the asynchronous mode, the facility preferably synchronizes its activities to prevent the reliance by any method on an inconsistent state of the table and segments. For example, the conversion of a segment to another type or division of a segment may not overlap in time with the addition of a row to the segment or the deletion of a row from the segment.

Methods

As mentioned above, the facility's functionality is preferably implemented as groups of methods supported by objects of FullSegment, PartialSegment, and MinimalSegment classes, all classes derived from the Segment object class, and the Table object class. The methods supported by objects of the classes derived from the Segment object class are said to comprise the "ISegment interface," while the methods supported by the Table object class are said to comprise an "ITable interface." An overview of the purpose of each of the methods supported by these classes is presented immediately below, after which the implementation of each method is discussed in greater detail in conjunction with a set of flow diagrams.

The ITable and ISegment interfaces are declared as follows:

exceed a maximum number of rows, the table object first invokes a SplitSegment method on itself to divide the full segment object into multiple segment objects, each having fewer than the maximum number of rows.

```
class ITable
{
    PUBLIC:
    VOID PutRow(row_data) = 0;
    VOID GetRowsAtBookmark(bookmark, skip_value, number_of_rows) = 0;
    VOID GetRowsByBookmarks(bookmark_list) = 0;
    VOID GetRowsAtPercentage(percentage, number_of_rows) = 0;
    VOID ResetCursorPosition () = 0;
    VOID GetNextRows(skip_value, number_of_rows) = 0;
    PRIVATE:
    VOID CheckAndAdjustMemoryUsage() = 0;
    VOID SplitSegment(segment_pointer) = 0;
    VOID ConvertFullToPartial(segment_pointer) = 0;
    VOID ConvertSegmentToMinimal(segment_pointer) = 0;
    VOID ConvertPartialToFull(segment_pointer) = 0;
    VOID ConvertMinimalToFull(segment_pointer) = 0;
}
class ISegment
{
    PUBLIC:
    INT NumberOfRows() = 0;
    INT MemoryUsed() = 0;
    VOID PutRow(row data, sorts_to_end_flag) = 0;
    VOID GetRowsAtBookmark(bookmark, skip_value, number_of_rows) = 0; // defined only for
        class FullSegment
    VOID SkipRows (bookmark, skip_value) = 0;
    VOID TransferPortionOfRowsToFull(segment_pointer) = 0; // defined only for class
FullSegment
    VOID TransferRowsToPartial(segment_pointer) = 0; // defined only for class FullSegment
    VOID TransferRowsToFull(segment_pointer) = 0; // defined only for class PartialSegment
}
```

Figure 13:
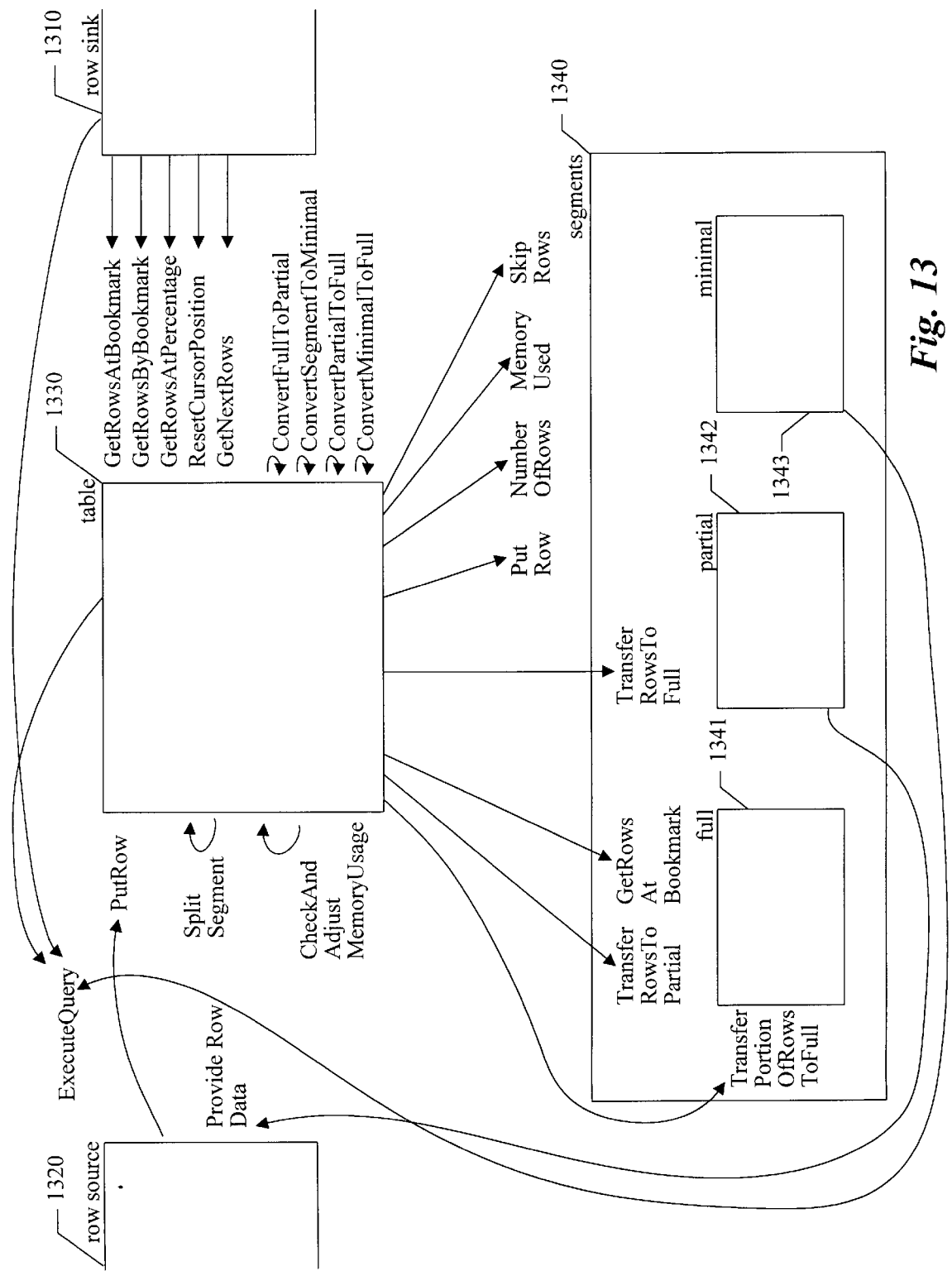
FIG. 13 is a method invocation overview diagram, showing the methods supported by each of the objects that comprise the facility.

FIG. 13 is a method invocation overview diagram, showing the methods supported by each of the objects that comprise the facility. The diagram shows a row sink program 1310 for initiating a query and consuming the results of the query, a row source program 1320 for executing and providing the result of the query, a table object 1330 for managing the query result and responding to requests from the row sink program for data from the query result, and the number of segment objects 1340 for storing the query result data on the table object's behalf. For the sake of illustration, only one segment object of each class is shown: a full segment object 1341, a partial segment object 1342, and a minimal segment object 1343.

The row sink program initiates a query by calling an ExecuteQuery routine of the row source program specifying the information needed to perform the query, such as the identity of the data table or tables to query, selection criteria, sorting criteria, and the columns of the data table to include in the results. Either the row source program or the row sink program can instantiate the table object, which in turn instantiates a segment object. The instantiating program preferably passes a reference to the other program so that they may both invoke methods of the table object. While it is executing the query, the row source program repeatedly invokes a PutRow method of the table object in order to add rows of the results set to those maintained by the table object. Based on a key value of each row, the table object invokes a PutRow method of one of the segment objects whose key subrange contains the key value of the new row. The PutRow method of the selected segment object stores information about the new row in the segment object for future retrieval. If the invocation of the PutRow method on a full segment object will cause the full segment object to The row sink program may request row data for rows of the result set by invoking one of several methods of the table object. The row sink program may invoke a GetRowsAtBookmark method of the table object to retrieve a specified number of rows starting with the row having a specified bookmark. The row sink program may invoke a GetRowsByBookmarks method of the table object, specifying a list of bookmarks, in order to retrieve the rows having those bookmarks. The row sink program may invoke a GetRowsAtPercentage method of the table object in order to retrieve a specified number of rows starting at or near the row that is a specified percentage of the total number of rows in the table object from the beginning of the table object. The row sink program may further invoke a ResetCursorPosition method of the table object for positioning a cursor at the beginning of the result set, then invoke a GetNextRows method of the table object to retrieve a specified number of rows starting at the present cursor position and advance the cursor position to the row following the last retrieved row.

The segment objects support several methods used by the table object to process row data requests from the row sink program. The table object may invoke a GetRowsAtBookmark method on a full segment object to return a specified number of rows starting with the row of the full segment object having the specified bookmark. The table object may also invoke the GetRowsAtBookmark method on a full segment object to get a specified number of rows beginning at a specified row number within the full segment object. The table object may further invoke a NumberOfRows method on a segment object to determine the number of rows that it contains. The table object may also invoke a SkipRows method on a segment object to skip over a specified number of rows before returning row data.

The table object, when it performs an operation resulting in the consumption of additional memory, invokes a CheckAndAdjustMemoryUsage method on itself in order to determine whether total memory usage has exceeded a maximum limit, and, if so, to reduce the total amount of memory being consumed to represent the query result. In order to do so, the table object may invoke a ConvertFullToPartial method on itself in order to transform a full segment object into a smaller partial segment object. (The ConvertFullToPartial method in turn invokes a TransferRowsToPartial method of the full segment object.) The table object may also invoke a ConvertSegmentToMinimal method on itself in order to convert a full or partial segment object to a yet smaller minimal segment object. When a row retrieval method (i.e., GetRowsAtBookmark, GetRowsByBookmarks, GetRowsAtPercentage, or GetNextRows) is invoked on the table object for rows represented by a partial or a minimal segment object, the table object invokes on itself a ConvertPartialToFull or ConvertMinimalToFull method in order to restore the full row information needed to service the row retrieval method invocation. In the case of partial segment objects, the ConvertPartialToFull method invokes a TransferRowsToFull method of the partial segment object, which in turn calls a ProvideRowData routine of the row source program in order to retrieve rows quickly using their bookmarks stored in the partial segment object. In the case of minimal segment objects, the ConvertMinimalToFull method of the table calls the ExecuteQuery routine of the row source program to reexecute the query for the key subrange of the minimal segment object. These methods and their implementations are each discussed in greater detail below.

Figure 14:
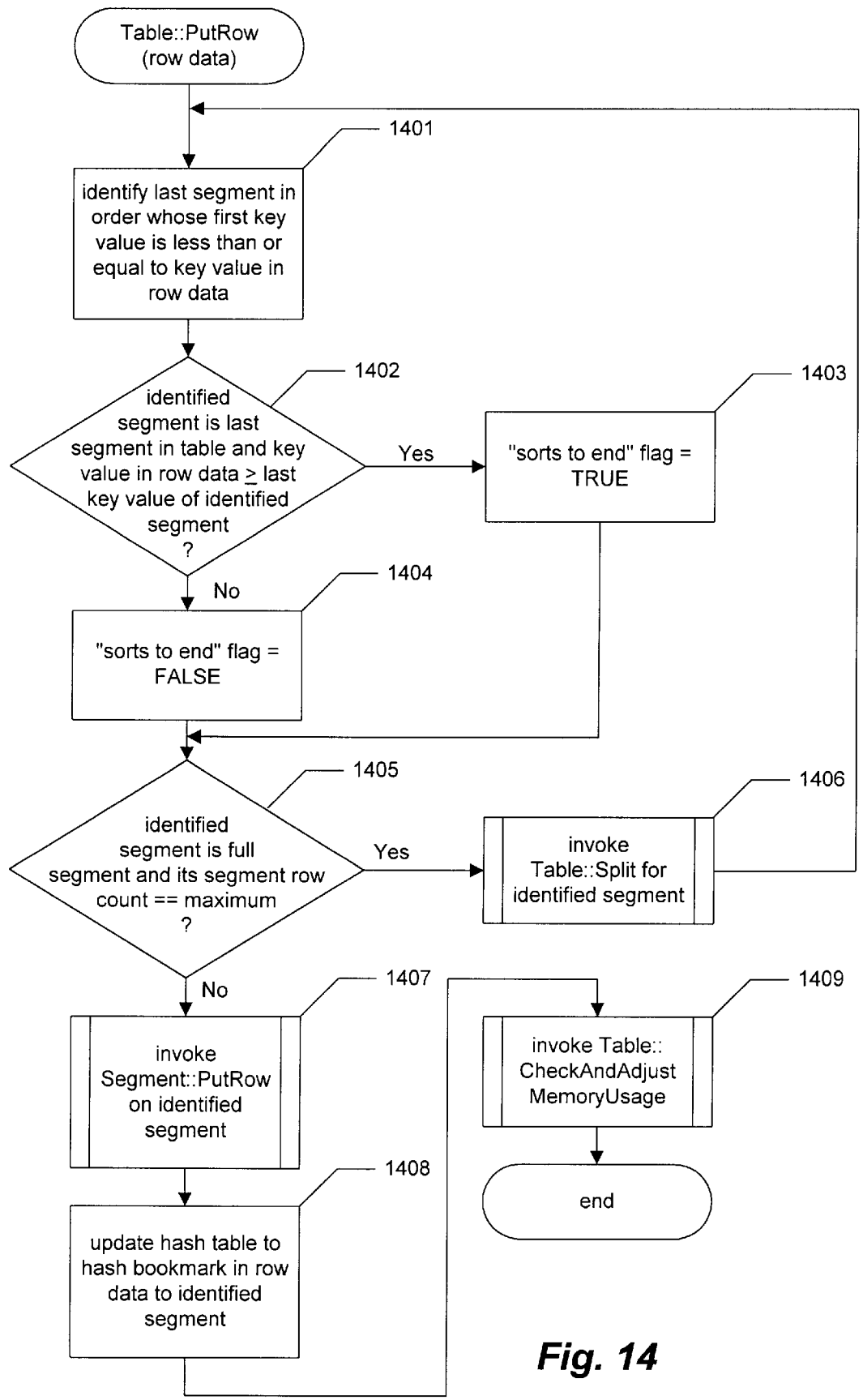
FIG. 14 is a flow diagram depicting the implementation of the Table::PutRow method.

The flow diagrams whose descriptions follow generally comply with ANSI/ISO 5807-1985, a standard for, among other things, symbols and conventions for program flow charts propagated by the International Standards Organization and adopted by the American National Standards Institute. FIG. 14 is a flow diagram depicting the implementation of the Table::PutRow method. The Table::PutRow method is invoked by the row source program to add a row of the result set to the table object. It takes as a parameter the row data that is the subject of the Table::PutRow method. Some row source programs do not initially provide all of the row data for a new row as a parameter to the Table::PutRow method, but rather provide only a bookmark for the new row. In such cases, the Table::PutRow method preferably calls the ProvideRowData routine of the row source program passing in the bookmark provided by the row source program, in order to retrieve the row data for the new row (not shown). The Table::PutRow method preferably calls the ProvideRowData routine of the row source program only for rows that will be added to a full segment, and does not call the ProvideRowData routine for rows that will be added to partial or minimal segments. In step 1401, the Table::PutRow method identifies the appropriate segment object to add the row to by identifying the last segment object in the key order of segment objects whose first key value is less than or equal to the key value in the row data. In steps 1402–1404, the Table::PutRow method adjusts the value of the "sorts to end" flag to reflect whether a row is being added at the end of the table in key value order. In step 1402, if the segment identified in step 1401 is the last segment in the table and the key value in the data is greater than or equal to the last key value of the identified segment, then the "sorts to end" flag is set to TRUE in step 1403, else the "sorts to end" flag is set to FALSE in step 1404. In step 1405, if the segment object identified in step 1401 is a full segment and its row count is equal to the maximum number of rows for a full segment object, then the Table::PutRow method continues at step 1406 to divide the full segment object into two full segment objects each having a row count less than the maximum, else the Table::PutRow method continues at step 1407 to add the row to the segment object. Alternatively, in step 1405, the Table::PutRow method determines whether to split the full segment object by determining whether the total amount of memory consumed by the full segment object exceeds a maximum memory threshold instead of by determining whether the total number of rows of the full segment object exceeds a maximum number of rows. In step 1406, the Table::PutRow method invokes the Table::Split method for the segment identified in step 1401 in order to divide this large segment into two smaller segments, passing the Table::Split method a pointer to the full segment to be split, the "sorts to end" flag, and the key value of the row data. After step 1406, the Table::PutRow method continues at step 1401 to determine which of the two segments produced by splitting the identified segment should contain the new row.

In step 1407, the Table::PutRow method invokes the Segment::PutRow method on the identified segment object. In step 1408, the Table::PutRow method updates the hash table object 313 in the table object 310 (FIG. 3) to hash the bookmark in the row data to the segment identified in step 1401. In step 1409, the Table::PutRow method invokes the Table::CheckAndAdjustMemoryUsage method to determine whether adding the new row to the segment object has caused the total memory used to exceed a maximum threshold, and, if so, to reduce the total memory used. After step 1409, the Table::PutRow method returns.

Figure 15:
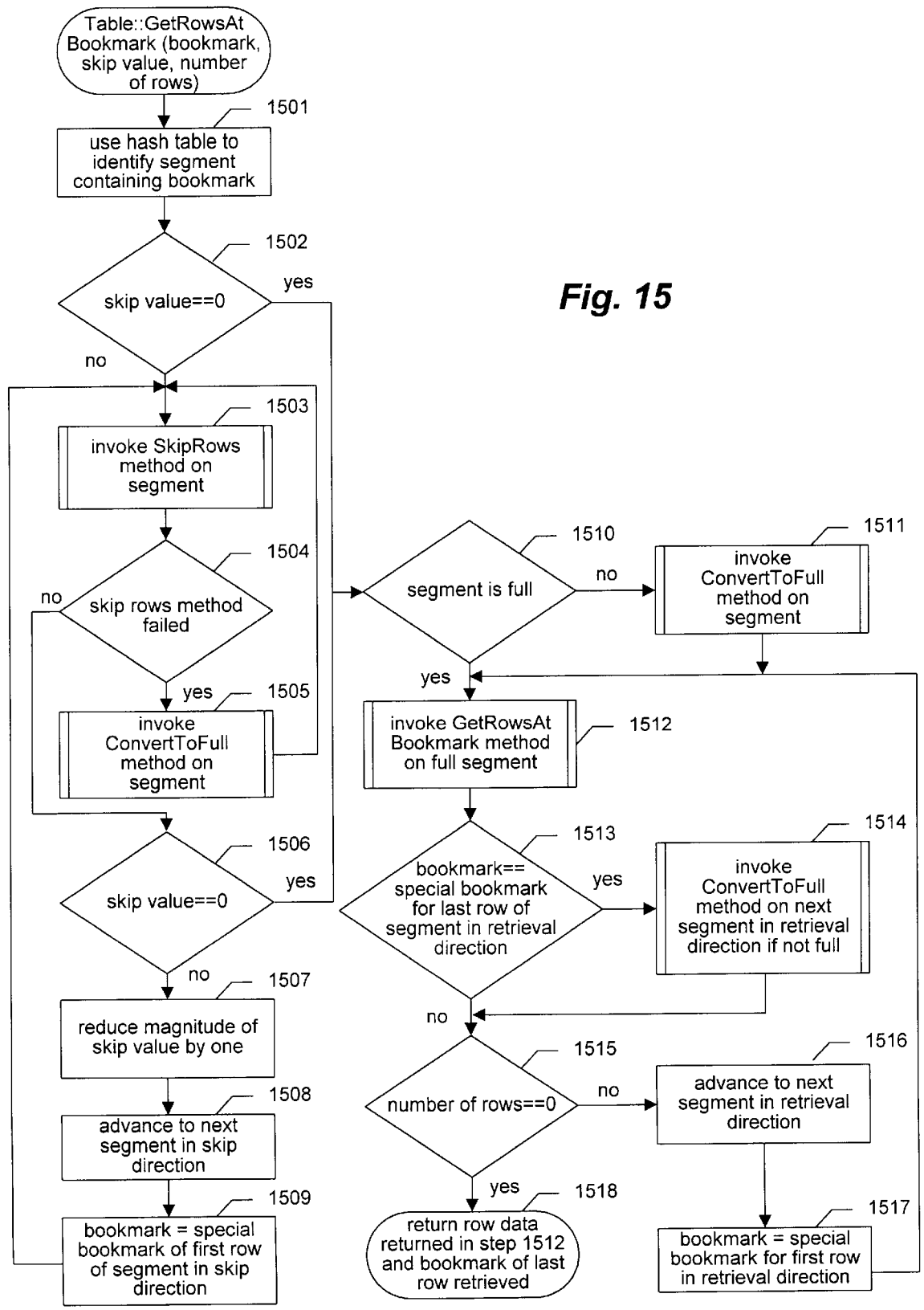
FIG. 15 is a flow diagram depicting the implementation of the Table::GetRowsAtBookmark method.

FIG. 15 is a flow diagram depicting the implementation of the Table::GetRowsAtBookmark method. The Table::GetRowsAtBookmark method takes the following parameters: a bookmark for the row at which to begin; a signed "skip value" indicating the number of rows to skip over before retrieving rows; and a signed number of rows to return. The skip value may be either positive or negative: a positive skip value specifies skipping in the forward direction, while a negative skip value specifies skipping in the backward direction. The number of rows may also be either positive or negative, indicating in the same manner whether rows are to be retrieved in the forward or backwards direction. The Table::GetRowsAtBookmark method is invoked by the row sink program to retrieve the specified number of rows in the specified direction starting with the row having the specified bookmark as adjusted by the specified skip value and direction.

In step 1501, the Table::GetRowsAtBookmark method uses the hash table object in the table object to identify the segment object containing the specified bookmark. In step 1502, if the skip value is equal to zero, then the Table::GetRowsAtBookmark method continues at step 1510, else the Table::GetRowsAtBookmark method continues at step 1503. In steps 1503–1509, the Table::GetRowsAtBookmark method processes the skip value by skipping the specified number of rows in the specified direction from the starting row. In step 1503, the Table::GetRowsAtBookmark method invokes the SkipRows method on the current segment. As discussed below in greater detail in conjunction with FIGS. 27–29, the SkipRows method skips as many rows as possible in the current segment up to the last row in the skip direction, adjusting the bookmark and skip value to reflect this skipping. The partial and minimal segment implementations of the SkipRows method return an indication of failure if they are unable to skip rows of the current segment without converting the current segment to a full segment. In step 1504, if the SkipRow method returned an indication of failure, then the Table::GetRowsAtBookmark method continues in step 1505, else the Table::GetRowsAtBookmark method continues in step 1506. In step 1505, the Table::GetRowsAtBookmark method invokes a ConvertToFull method on the current segment in order to convert the current segment into a full segment. After step 1505, the Table::GetRowsAtBookmark method continues at step 1503 to invoke the full segment implementation of the SkipRows method on the current segment. In step 1506, if the skip value is now equal to zero, then the specified number of rows have been skipped and the Table::GetRowsAtBookmark method continues in step 1510, else the Table::GetRowsAtBookmark method continues in step 1507. In step 1507, the Table::GetRowsAtBookmark method reduces the magnitude of the skip value by one to reflect skipping from the last row in the skip direction of the previous segment to the first row in the skip direction of the next segment. In step 1508, the Table::GetRowsAtBookmark method advances from the current segment to the next segment in the skip direction. In step 1509, the Table::GetRowsAtBookmark method sets the current bookmark equal to a special bookmark identifying the first row of the new current segment in the skip direction. In other words, if the skip direction is forward, the Table::GetRowsAtBookmark method sets the current bookmark equal to the special bookmark of the first row of the current segment, while if the skip direction is backwards, the Table::GetRowsAtBookmark method sets the current bookmark equal to a special bookmark identifying the last row of the current segment. After step 1509, the Table::GetRowsAtBookmark method continues at step 1503 to invoke the SkipRows method on the new current segment.

In step 1510, if the current segment is a full segment, then the Table::GetRowsAtBookmark method continues at step 1512, else the Table::GetRowsAtBookmark method continues at step 1511. In step 1511, the Table::GetRowsAtBookmark method invokes the ConvertPartialToFull or ConvertMinimalToFull method on the partial or minimal current segment. In steps 1512–1517, the Table::GetRowsAtBookmark method retrieves the data for the specified number of rows. In step 1512, the Table::GetRowsAtBookmark method invokes the GetRowsAtBookmark method on the current full segment object. As is discussed below in greater detail in conjunction with FIG. 26, the FullSegment::GetRowsAtBookmark method retrieves up to the remaining number of rows to retrieve from the full segment upon which it is invoked. The FullSegment::GetRowsAtBookmark method adjusts the current bookmark and number of rows to reflect this retrieval. In step 1513, if the current bookmark is a special bookmark identifying the last row of the current segment in the retrieval direction, then the Table::GetRowsAtBookmark method continues in step 1514, else the Table::GetRowsAtBookmark method continues in step 1515. In step 1514, if the next segment in the retrieval direction is a partial segment, then the Table::GetRowsAtBookmark method invokes the ConvertPartialToFull method on this segment in order to convert it to a full segment. If the next segment in the retrieval direction is a minimal segment, the Table::GetRowsAtBookmark method invokes the ConvertMinimalToFull method on this segment to convert the segment into a full segment.

In step 1515, if the remaining number of rows to retrieve is equal to zero, then the specified number of rows have been retrieved and the Table::GetRowsAtBookmark method continues in step 1518, else the Table::GetRowsAtBookmark method continues in step 1516. In step 1516, the Table::GetRowsAtBookmark method advances from the current segment to the next segment in the retrieval direction. In step 1517, the Table::GetRowsAtBookmark method sets the current bookmark equal to a special bookmark identifying the first row of the current segment in the retrieval direction. After step 1517, the Table::GetRowsAtBookmark method continues in step 1512 to repeat the process of retrieving rows from the current segment.

In step 1518, the Table::GetRowsAtBookmark method returns the row data returned in step 1512, along with the bookmark of the last row retrieved.

Figure 16:
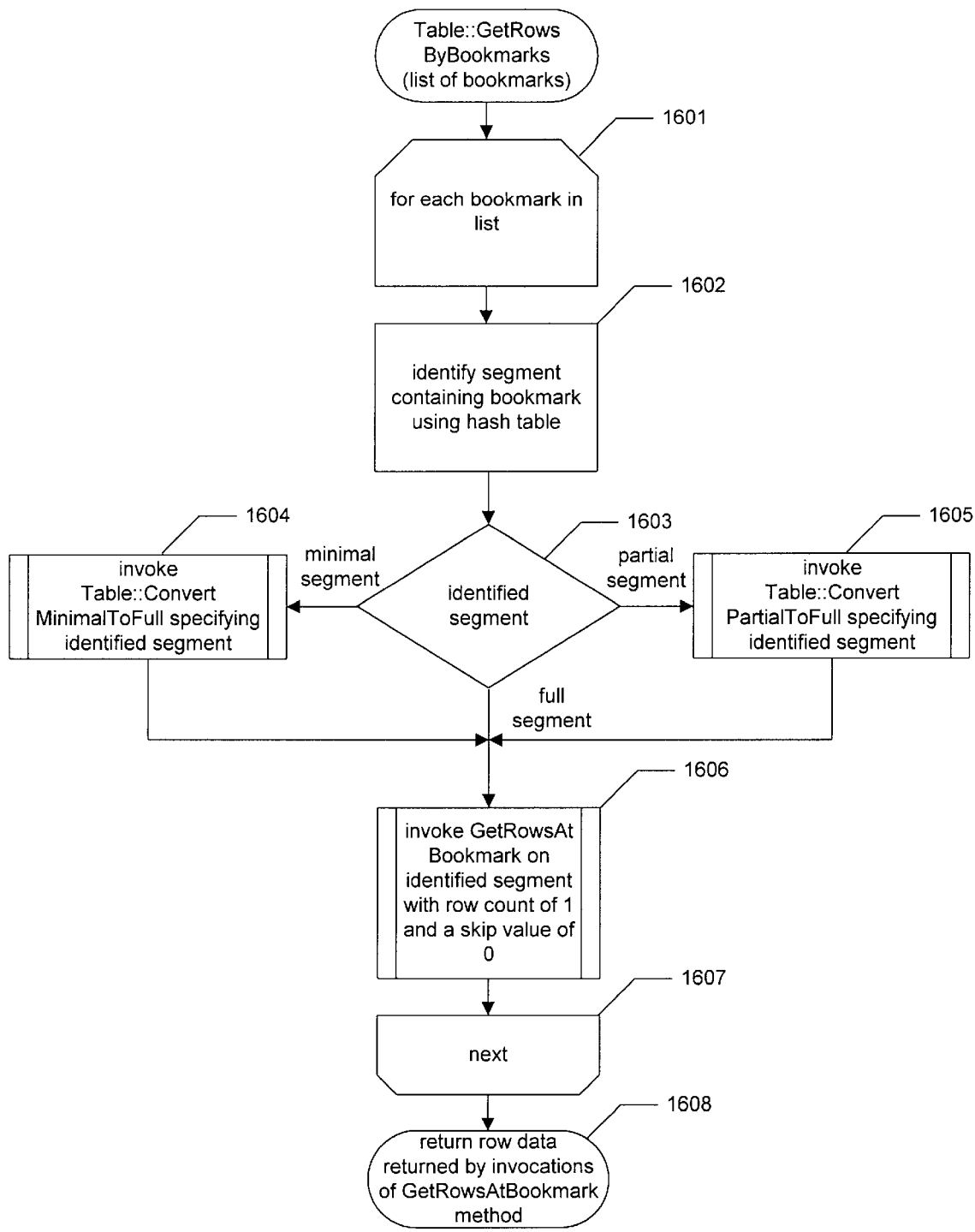
FIG. 16 is a flow diagram depicting the implementation of the Table::GetRowsByBookmarks method.

FIG. 16 is a flow diagram depicting the implementation of the Table::GetRowsByBookmarks method. The Table::GetRowsByBookmarks method takes as a parameter a list of bookmarks, and is invoked by the row sink program to retrieve the rows having the specified bookmarks. In steps 1601–1607, the Table::GetRowsByBookmarks method loops through each bookmark in the list of bookmarks. Step 1601 marks the beginning of this loop, and step 1607 the end. In step 1602, the Table::GetRowsByBookmarks method identifies the segment object containing the bookmark using the hash table object in the table object. In step 1603, if the segment identified in step 1602 is a minimal segment, then the Table::GetRowsByBookmarks method continues at step 1604, else if the segment identified in step 1602 is a partial segment, then the Table::GetRowsByBookmarks method continues at step 1605, else the segment identified in step 1602 is a full segment and the Table::GetRowsByBookmarks method continues at step 1606. In step 1604, the Table::GetRowsByBookmarks method invokes the Table::ConvertMinimalToFull method in order to convert the identified minimal segment into a full segment having complete row data for servicing the row retrieval request. After step 1604, the Table::GetRowsByBookmarks method continues at step 1606. In step 1605, the Table::GetRowsByBookmarks method invokes the Table::ConvertPartialToFull method in order to convert the identified partial segment into a full segment having complete row data for servicing the row retrieval request. After step 1605, the Table::GetRowsByBookmarks method continues at step 1606. In step 1606, the Table::GetRowsByBookmarks method invokes the GetRowsAtBookmark method on the identified segment object with a row count of 1 and a skip count of 0 in order to retrieve the current row from that segment object. In step 1607, the Table::GetRowsByBookmarks method loops back to step 1601 to process the next bookmark in the list. In step 1608, the Table::GetRowsByBookmarks method returns the row data returned by the GetRowsAtBookmark method invocations performed in step 1606. These steps then conclude.

Figure 17:
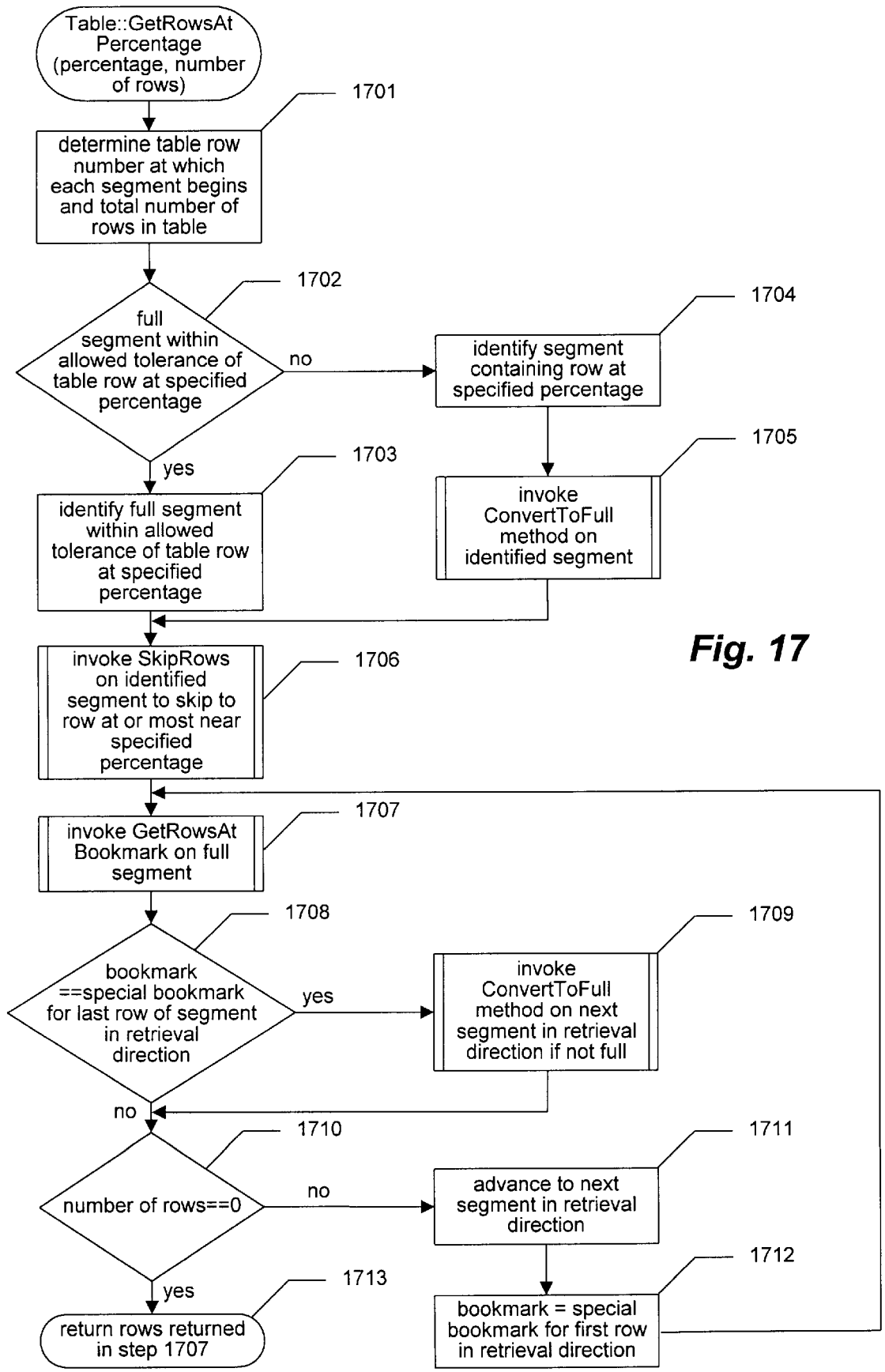
FIG. 17 is a flow diagram depicting the implementation of the Table::GetRowsAtPercentage method.

FIG. 17 is a flow diagram depicting the implementation of the Table::GetRowsAtPercentage method. The Table::GetRowsAtPercentage method takes as parameters a percentage and a number of rows, and is invoked by the row sink program to retrieve the specified number or rows starting at or near the row that is the specified percentage of the total number of rows in the result set from the beginning of the result set. In steps 1701–1706, the Table::GetRowsAtPercentage method identifies the position in the table at which to begin retrieving row data. In step 1701, the Table::GetRowsAtPercentage method determines the result set row number at which each segment object begins and the total number of rows in the table object by invoking the NumberOfRows method on each segment object. In step 1702, if there is a full segment object whose rows are within an allowed maximum tolerance of the result set row at the specified percentage, then the Table::GetRowsAtPercentage method continues at step 1703 else the Table::GetRowsAt- Percentage method continues at step 1705. In step 1703, the Table::GetRowsAtPercentage method identifies for retrieval a full segment within the allowed tolerance of the row at the specified percentage. After step 1703, the Table::GetRowsAtPercentage method continues at step 1706. In step 1704, the Table::GetRowsAtPercentage method identifies for retrieval the segment containing the row at the specified percentage. In step 1705, the Table::GetRowsAtPercentage method invokes the Table::ConvertPartialToFull method or the Table::ConvertMinimalToFull method in order to convert the identified partial or minimal segment into a full segment containing complete row data for satisfying the row retrieval request.

In step 1706, the Table::GetRowsAtPercentage method invokes the SkipRows method on the segment identified in step 1703 or 1704 in order to skip to the row of this segment at or most near the specified percentage. In a preferred embodiment, the Table::GetRowsAtPercentage method adjusts the starting point for retrieval, and therefore the skip value, to allow all of the requested rows to be retrieved from the identified full segment, if possible. In steps 1707–1713, the Table::GetRowsAtPercentage method retrieves the data for the specified number of rows. In step 1707, the Table::GetRowsAtPercentage method invokes the GetRowsAtBookmark method on the current full segment object. As is discussed below in greater detail in conjunction with FIG. 26, the FullSegment::GetRowsAtBookmark method retrieves up to the remaining number of rows to retrieve from the full segment upon which it is invoked. The FullSegment::GetRowsAtBookmark method further adjusts the current bookmark and number of rows to reflect this retrieval. In step 1708, if the current bookmark is a special bookmark identifying the last row of the current segment in the retrieval direction, then the Table::GetRowsAtPercentage method continues in step 1709 to convert the next segment in the retrieval direction to a full segment if it is not a full segment, else the Table::GetRowsAtPercentage method continues in step 1710. In step 1709, if the next segment in the retrieval direction is a partial segment, then the Table::GetRowsAtPercentage method invokes the ConvertPartialToFull method on this segment in order to convert it to a full segment. If the next segment in the retrieval direction is a minimal segment, the Table::GetRowsAtPercentage method invokes the ConvertMinimalToFull method on this segment to convert the segment into a full segment.

In step 1710, if the remaining number of rows to retrieve is equal to zero, then the specified number of rows have been retrieved and the Table::GetRowsAtPercentage method continues in step 1713, else the Table::GetRowsAtPercentage method continues in step 1711. In step 1711, the Table::GetRowsAtPercentage method advances from the current segment to the next segment in the retrieval direction. In step 1712, the Table::GetRowsAtPercentage method sets the current bookmark equal to a special bookmark identifying the first row of the current segment in the retrieval direction. After step 1712, the Table::GetRowsAtPercentage method continues in step 1707 to repeat the process of retrieving rows from the current segment.

In step 1713, the Table:GetRowsAtPercentage method returns the row data returned by invocations of the GetRowsAtBookmark method in step 1707.

Figure 18:
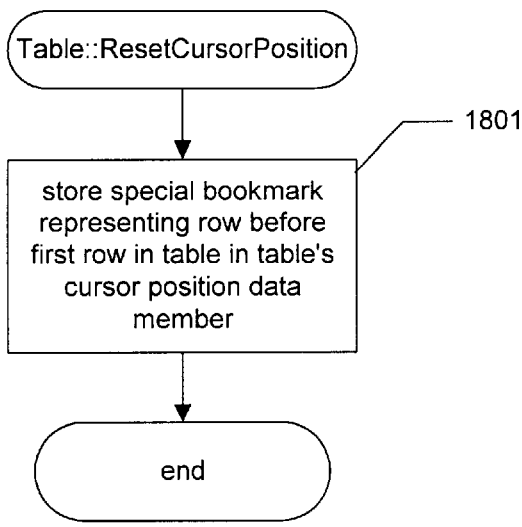
FIG. 18 is a flow diagram depicting the implementation of the Table::ResetCursorPosition method.

FIG. 18 is a flow diagram depicting the implementation of the Table::ResetCursorPosition method. This method has no parameters, and is invoked by the row sink program to position the cursor at the first row of the table. In step 1801, the Table::ResetCursorPosition method stores a special bookmark identifying an imaginary row before the first row in the table in the cursor position data member 314 of the table object 310 (FIG. 3). The facility stores the special bookmark in the cursor position data member so that, when the row sink program invokes the Table::GetNextRows method after invoking the Table::ResetCursorPosition method, the Table::GetNextRows method skips one row from the special bookmark to the first row of the table to begin retrieval. These steps then conclude.

Figure 19:
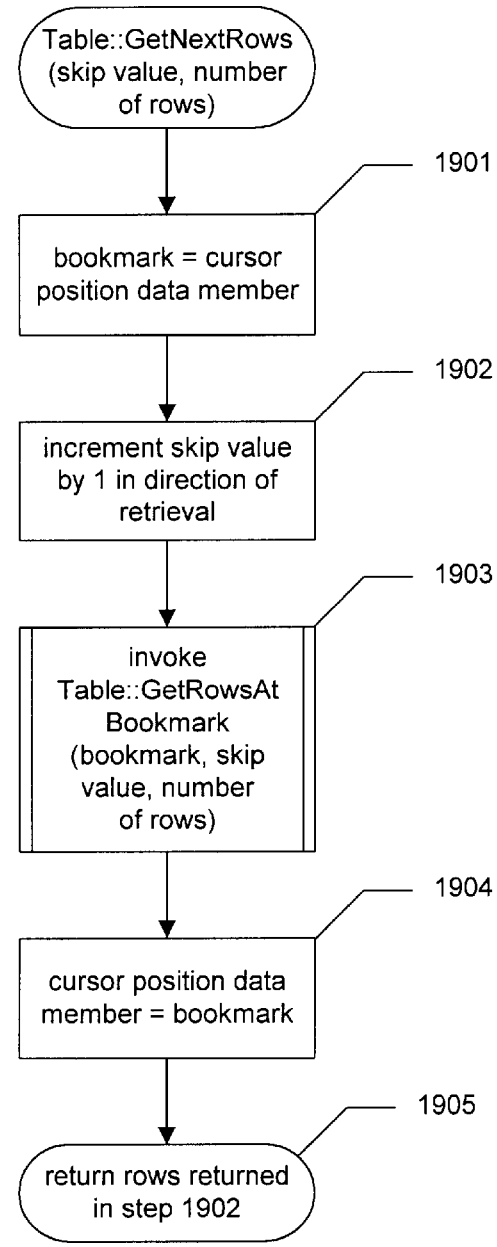
FIG. 19 is a flow diagram depicting the implementation of the Table::GetNextRows method.

FIG. 19 is a flow diagram depicting the implementation of the Table::GetNextRows method. This method takes the following parameters: a signed "skip value" indicating the number of rows to skip over before retrieving rows and the direction in which to skip; and a signed number of rows indicating the number of rows to retrieve and the direction in which to retrieve, the Table::GetNextRows method is invoked by the row sink program to retrieve the specified number of rows in the specified direction, starting with the row past the current cursor position, as set by prior invocations of the Table::ResetCursorPosition method and/or the Table::GetNextRows method, and as adjusted by the specified skip value and direction. In step 1901, the Table::GetNextRows method sets the current bookmark equal to the bookmark stored in the cursor position data member of the table object. In step 1902, the Table::GetNextRows method increments the skip value passed to the Table::GetNextRows method by one in the direction of retrieval to skip from the last row retrieved by the previous invocation of the Table::GetNextRows method to the next row in the direction of retrieval. In step 1903, the Table::GetNextRows method invokes the Table::GetRowsAtBookmark method in order to retrieve the requested rows. As part of step 1903, the Table::GetNextRows method passes the current bookmark set in step 1901, the skip value incremented in step 1902, and the number of rows passed to the Table::GetNextRows method as parameters. Invocation of the Table::GetRowsAtBookmark method in step 1903 updates the current bookmark variable to contain the bookmark of the last row retrieved. In step 1904, the Table::GetNextRows method stores this new current bookmark in the cursor position data member of the table object. In step 1905, the Table::GetNextRows method returns the row data returned by the invocation of the Table::GetRowsAtBookmark method in step 1902.

Figure 20:
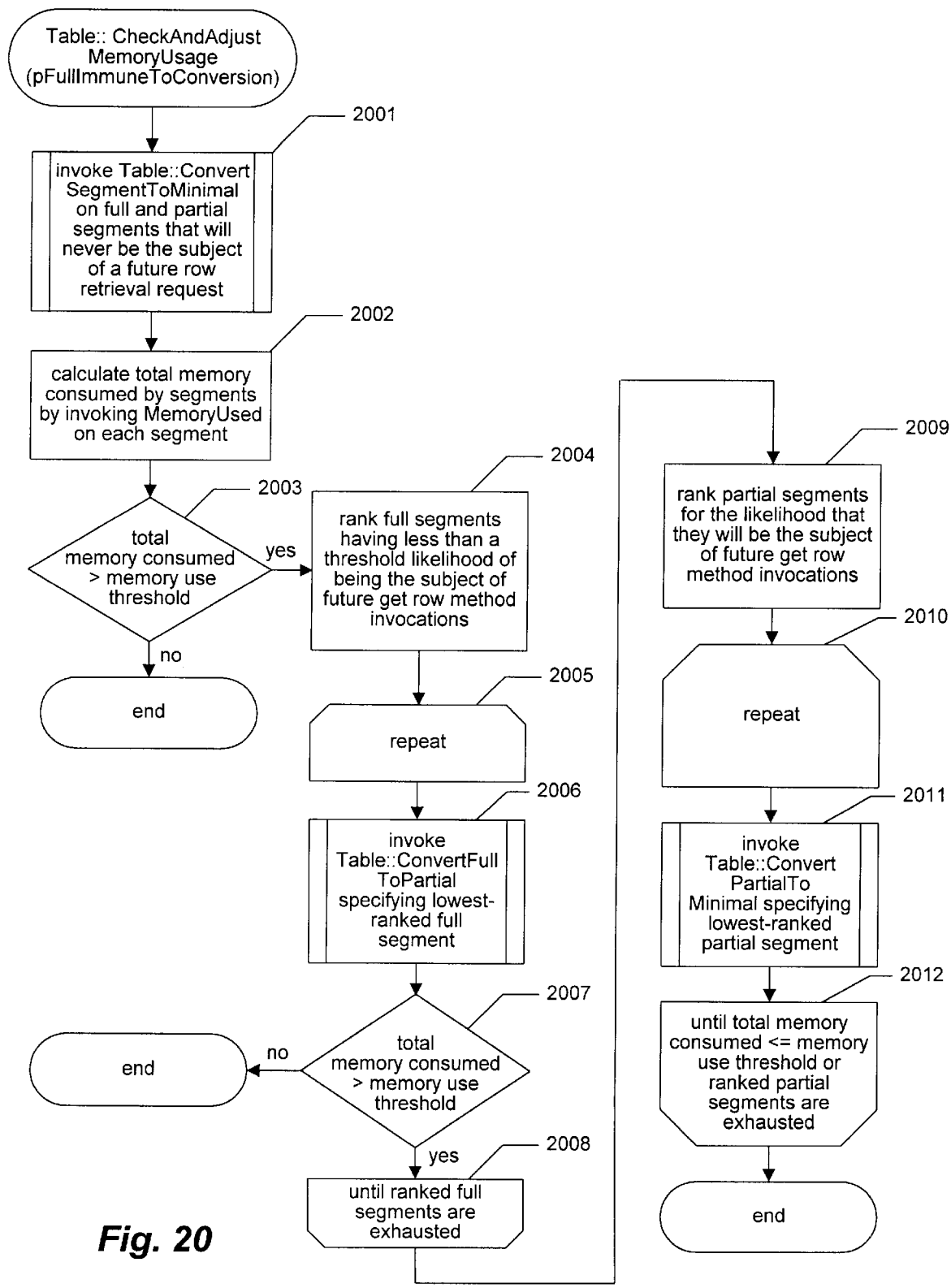
FIG. 20 is a flow diagram depicting the implementation of the Table::CheckAndAdjustMemoryUsage method.

FIG. 20 is a flow diagram depicting the implementation of the Table::CheckAndAdjustMemoryUsage method. This method is invoked by the table object when it performs operations on the segment objects increasing their memory consumption to ensure that total memory consumption remains in compliance with the predetermined maximum ("memory used threshold"). The memory used threshold is preferably configurable by the user. In cases in which the user does not specify a memory used threshold, the facility preferably chooses the memory used threshold automatically, based on the size of physical memory 230 (FIG. 2) available in the computer system, the number of table objects that are typically used simultaneously to manage different result sets, and the extent of other demands on memory from other programs executing in the computer system. If total memory consumption exceeds the memory used threshold, then the method reduces the amount of memory consumed by converting full segment objects to partial segment objects in the increasing order of their likelihood of being the subject of future row data referral requests, and, if necessary, also converts eligible partial segment objects into minimal segment objects in the increasing order of their likelihood of being the subject of future row data referral requests.

The Table::CheckAndAdjustMemoryUsage method takes as its parameter a pointer to a full segment that is to be exempted from conversion to a partial segment, such as a segment that was recently converted to a full segment. In step 2001, the Table::CheckAndAdjustMemoryUsage method identifies any full or partial segments that will never be the subject of a future row retrieval request, and invokes the Table::ConvertSegmentToMinimal method on these segments to convert these segments into minimal segments. Step 2001 preferably involves identifying segments that, as discussed in more detail above, either are behind the current position of a "forward-only cursor" or do not contain any of the rows to which the row sink program has limited its retrieval. In step 2002, the Table::CheckAndAdjustMemoryUsage method calculates the total memory consumed by segment objects by invoking the MemoryUsed method on each segment object. In step 2003, if the total memory consumed calculated in step 2002 is greater than the memory used threshold, then the Table::CheckAndAdjustMemoryUsage method continues at step 2004, else these steps conclude. In step 2004, the Table::CheckAndAdjustMemoryUsage method creates an ordered list of segment objects that may be converted from full segment objects to partial segment objects. The list contains the full segment objects, except for the full segment specified as immune by the parameter and various other excluded full segments. The excluded full segments preferably include those that have less than a minimum number of rows, full segments into which partial or minimal segments are presently being expanded, and the first and last segments in key value order. This list is then ordered, or "ranked," according to the likelihood that each segment object will be the subject of future row retrieval method invocations. The ordering preferably takes into account the needs of the Table::GetRowsAtPercentage method by attributing a relatively large likelihood of future row retrieval method invocations to full segment objects that are surrounded on both sides by one or more partial or minimal segment objects. This has the effect of ultimately distributing full segment objects evenly throughout the key value range of the table object that may be used to service Table::GetRowsByPercentage method invocations.

In steps 2005–2008, the Table::CheckAndAdjustMemoryUsage method loops through the ranked full segment objects from the one least likely to be the subject of future GetRow method invocations to the one most likely to be the subject of future GetRow method invocations, converting each full segment object to a partial segment object, until the total memory consumed is no longer greater than the memory used threshold. In step 2006, the Table::CheckAndAdjustMemoryUsage method invokes the Table::ConvertFullToPartial method specifying the full segment object on the ordered list created in step 2003 least likely to be the subject of future GetRow method invocations. In step 2007, if the total memory consumed is still greater than the memory used threshold, then the Table::CheckAndAdjustMemoryUsage method continues at step 2008, else these steps conclude. In step 2008, if any ranked full segment objects remain unconverted, then the Table::CheckAndAdjustMemoryUsage method continues at step 2005 to convert the next ranked full segment object, else the Table::CheckAndAdjustMemoryUsage method continues at step 2009.

If the Table::CheckAndAdjustMemoryUsage method continues at step 2009, then the amount of consumed memory has not been reduced below the memory used threshold by converting all eligible full segment objects to partial segment objects. The Table::CheckAndAdjustMemoryUsage method therefore continues to reduce memory consumption by converting partial segment objects to minimal segment objects in steps 2009–2012. In step 2009, the Table::CheckAndAdjustMemoryUsage method ranks the partial segment object for the likelihood that they will be the subject of future GetRow method invocations. In steps 2010–2012, the Table::CheckAndAdjustMemoryUsage method loops through the ranked partial segment objects, converting each to a minimal segment object until the total memory consumed is reduced below the memory used threshold. In step 2011, the Table::CheckAndAdjustMemoryUsage method invokes the Table::ConvertPartialToMinimal method specifying the lowest ranked partial segment object. In step 2012, if the total memory consumed is less than or equal to the MemoryUsed threshold, where the ranked partial segment objects are exhausted, then these steps conclude, else the Table::CheckAndAdjustMemoryUsage method continues at step 2010 to process the next ranked partial segment object.

Figure 21:
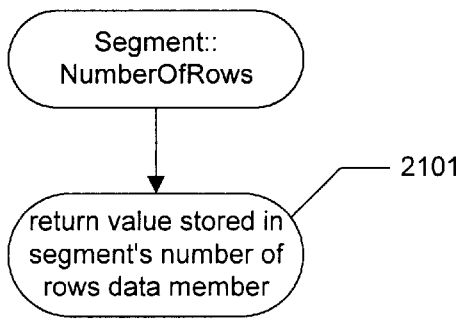
FIG. 21 is a flow diagram depicting the implementation of the Segment::NumberOfRows method.

FIG. 21 is a flow diagram depicting the implementation of the Segment::NumberOfRows method. This method is invoked by the table object to determine the number of rows represented by the segment object. In step 2101, the Segment::NumberOfRows method returns the value stored in the number of rows data member 443 in the segment object 440 (FIG. 4). These steps then conclude.

Figure 22:
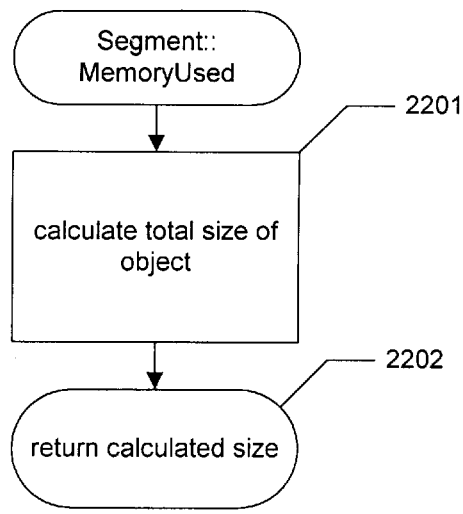
FIG. 22 is a flow diagram depicting the implementation of the Segment::MemoryUsed method.

FIG. 22 is a flow diagram depicting the implementation of the Segment::MemoryUsed method. This method is invoked by the table object to determine how much memory the segment object consumes. In step 2201, the Segment::MemoryUsed method calculates the total size of the segment object. In a preferred embodiment, the segment object caches the amount of memory used by each segment and only calculates the size of the segment object in step 2201 when no value has been cached, or when the cached value has been invalidated. In step 2202, the Segment::MemoryUsed method returns the size calculated in step 2201. These steps then conclude.

Figure 23:
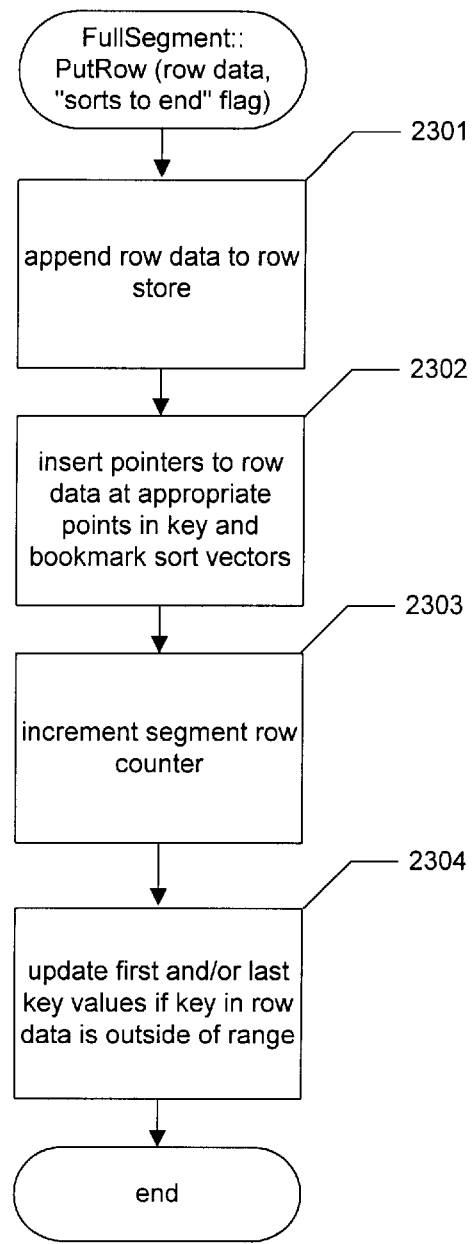
FIG. 23 is a flow diagram depicting the implementation of the FullSegment::PutRow method.

FIG. 23 is a flow diagram depicting the implementation of the FullSegment::PutRow method. This method takes the row data for a new row and a "sorts to end" flag as parameters. A "sorts to end" flag set to TRUE indicates that the caller is certain that the row data for the new row contains a key value that is larger than those contained by the rows that were the subject of foregoing invocations of PutRow methods. The FullSegment::PutRow method is invoked by the table object, or by a segment object converting or splitting itself, to add a row of the result set to the segment object. In step 2301, the FullSegment::PutRow method appends the row data for the new row to the row store 480 of the segment object 440 (FIG. 4). In step 2302, the FullSegment::PutRow method inserts pointers to the row data appended to the row store at appropriate points in the bookmark sort vector 491 and the key sort vector 492 (FIG. 4). If the value of the "sorts to end" flag is TRUE, then the pointer to the new row data added to the key sort vector is added at the end of the key sort vector. In step 2303, the FullSegment::PutRow method increments the segment object row counter 443 (FIG. 4). In step 2304, the FullSegment::PutRow method updates the first key value 441 and/or the last key value 442 (FIG. 4) if the key in the row data is outside of the segment object key subrange bounded by these two values. The FullSegment::PutRow method then returns.

Figure 24:
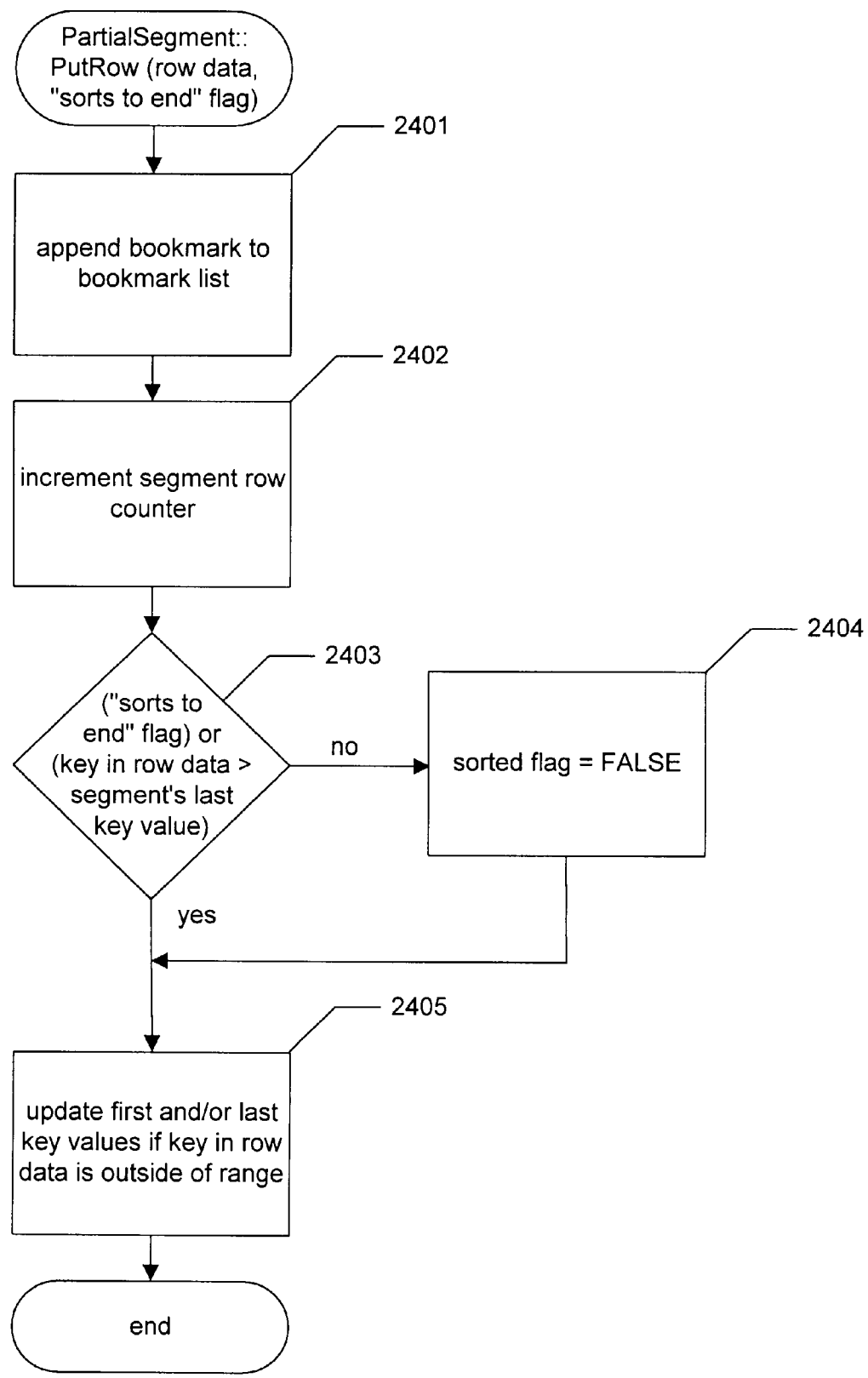
FIG. 24 is a flow diagram depicting the implementation of the PartialSegment::PutRow method.

FIG. 24 is a flow diagram depicting the implementation of the PartialSegment::PutRow method. This method takes row data for a new row and a "sorts to end" flag as parameters.

A "sorts to end" flag set to TRUE indicates that the caller, such as the table object, is certain that the row data contains a larger key value than the rows that have been the subject of earlier invocations of PutRow methods. In step 2401, the PartialSegment::PutRow method appends the bookmark from the row data for the new row to the bookmark list 1081 of the partial information segment object 1040 (FIG. 10). In a preferred embodiment, in addition to the bookmark for each row, the partial segment also contains contents of row data columns that will be expensive for the row source program to regenerate. Examples include calculated values that require reading an entire source database table in order to construct, such as "percentage of total" values. In accordance with this embodiment, the PartialSegment::PutRow method stores the row data from these columns in the partial segment object 1040 (not shown). In step 2402, the PartialSegment::PutRow method increments the segment row counter 1043 (FIG. 10). In step 2403, if the "sorts to end" flag is set to TRUE, or if the key value in the row data for the row is larger than the segment object's last key value 1042 (FIG. 10), then the PartialSegment::PutRow method continues immediately at step 2405, else the PartialSegment::PutRow method sets the sorted flag 1045 (FIG. 10) to FALSE, indicating that the bookmark list may no longer be sorted correctly in key value order, before continuing at step 2405. In step 2405, the PartialSegment::PutRow method updates the first key value 1041 and/or the last key value 1042 (FIG. 10) if the key in the row data is outside of the segment object key subrange bounded by those two values. These steps then conclude.

Figure 25:
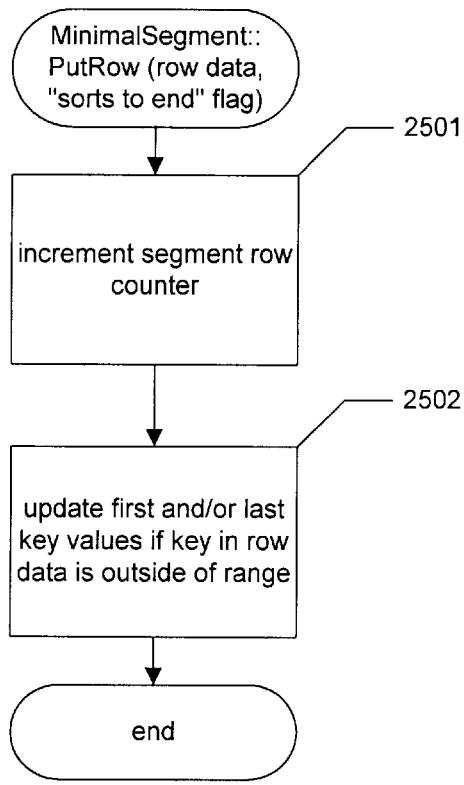
FIG. 25 is a flow diagram depicting the implementation of the MinimalSegment::PutRow method.

FIG. 25 is a flow diagram depicting the implementation of the MinimalSegment::PutRow method. In step 2501, the MinimalSegment::PutRow method increments the segment object row counter 1243 in the minimal information segment object 1240 (FIG. 12). In step 2502, the MinimalSegment::PutRow method updates the first key value 1241 and/or the last key value 1242 (FIG. 12) if the key in the row data is outside of the segment object key subrange bounded by these two values. These steps then conclude.

Figure 26:
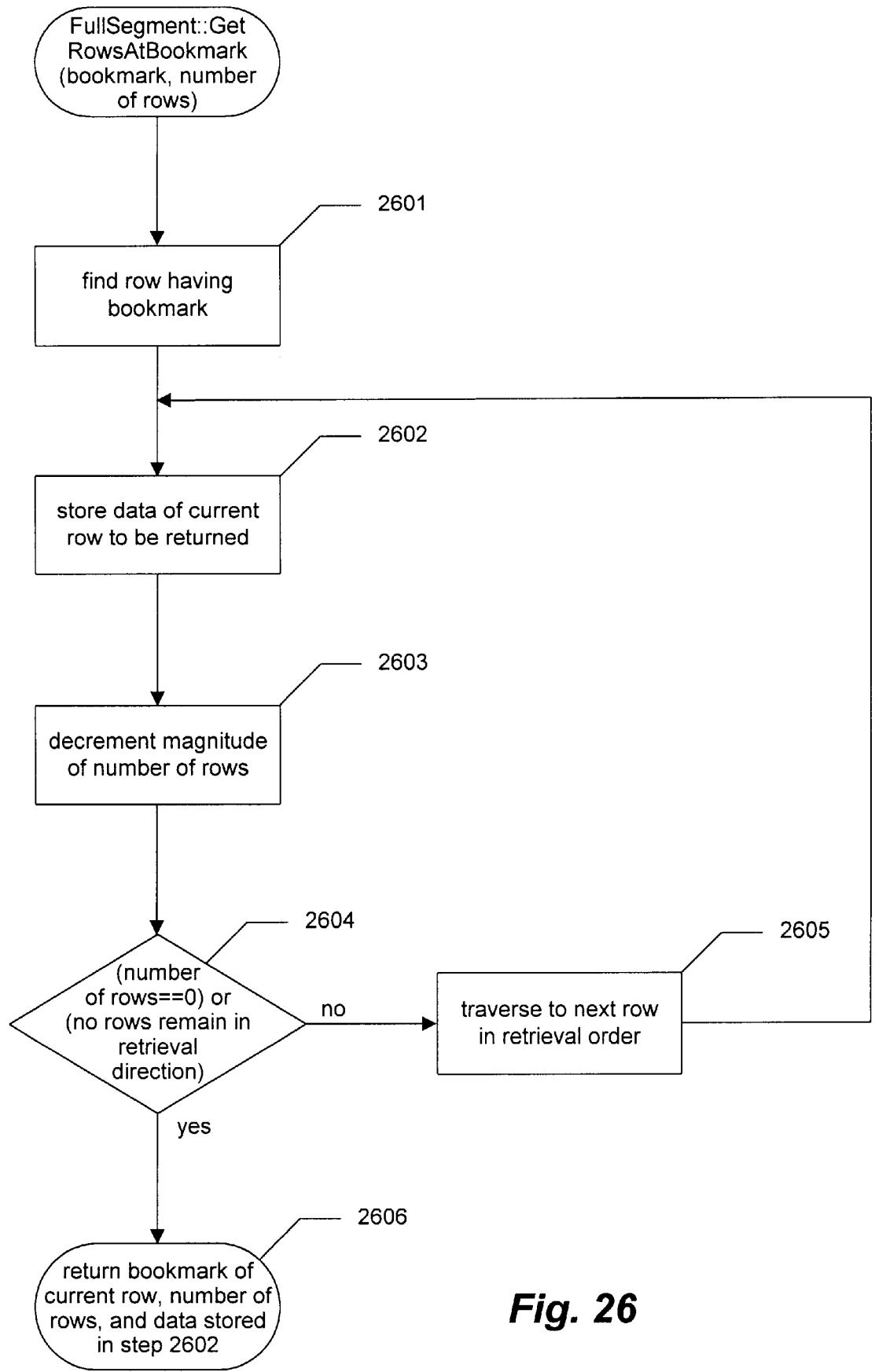
FIG. 26 is a flow diagram depicting the implementation of the FullSegment::GetRowsAtBpookmark method.

FIG. 26 is a flow diagram depicting the implementation of the FullSegment::GetRowsAtBookmark method. This method takes a bookmark and a number of rows to return as parameters, and is invoked by the Table::GetRowsAtBookmark method to retrieve the specified number of rows starting with the row having a specified bookmark. The bookmark may be one of the special bookmarks, identifying the first or last row of the segment. The number of rows may be either positive or negative, indicating whether rows are to be retrieved in the forward or backwards direction.

In step 2601, the FullSegment::GetRowsAtBookmark method searches the row store 480 of the full segment object 440 for the specified bookmark, preferably using a binary search on the bookmark sort vector 491 (FIG. 4). The FullSegment::GetRowsAtBookmark method alternatively searches the row store for the specified bookmark using other advantageous methods, including hashing the bookmark to the row containing it using a dedicated per-segment hash table. If the bookmark is a special bookmark identifying the first or last row of the segment, the FullSegment::GetRowsAtBookmark method merely selects this row of the segment (not shown). The FullSegment::GetRowsAtBookmark method then loops through rows 2602–2605 in order return row data from the segment while the remaining number of rows to return is greater than zero and while the segment contains additional rows in the retrieval direction. In step 2602, the FullSegment::GetRowsAtBookmark method stores the data of the current row in order to return this data when the FullSegment::GetRowsAtBookmark method returns in step 2606. In step 2603, the FullSegment::GetRowsAtBookmark method decrements the magnitude of the number of rows. That is, if the number of rows is positive, the FullSegment::GetRowsAtBookmark method subtracts one from the number of rows, while, if the number of rows is negative, the FullSegment::GetRowsAtBookmark method adds one to the number of rows. In step 2604, if the remaining number of rows is equal to zero or if no rows remain in the segment in the retrieval direction, then the FullSegment::GetRowsAtBookmark method continues in step 2606, else the FullSegment::GetRowsAtBookmark method continues in step 2605. In step 2605, the FullSegment::GetRowsAtBookmark method traverses, in the key sort vector, one row in the retrieval direction. After step 2605, the FullSegment::GetRowsAtBookmark method continues at step 2602 to store the data of the new current row to be returned.

In step 2606, the FullSegment::GetRowsAtBookmark method returns the bookmark of the current row, the remaining number of rows to retrieve, and the data stored to be returned in step 2602.

Figure 27:
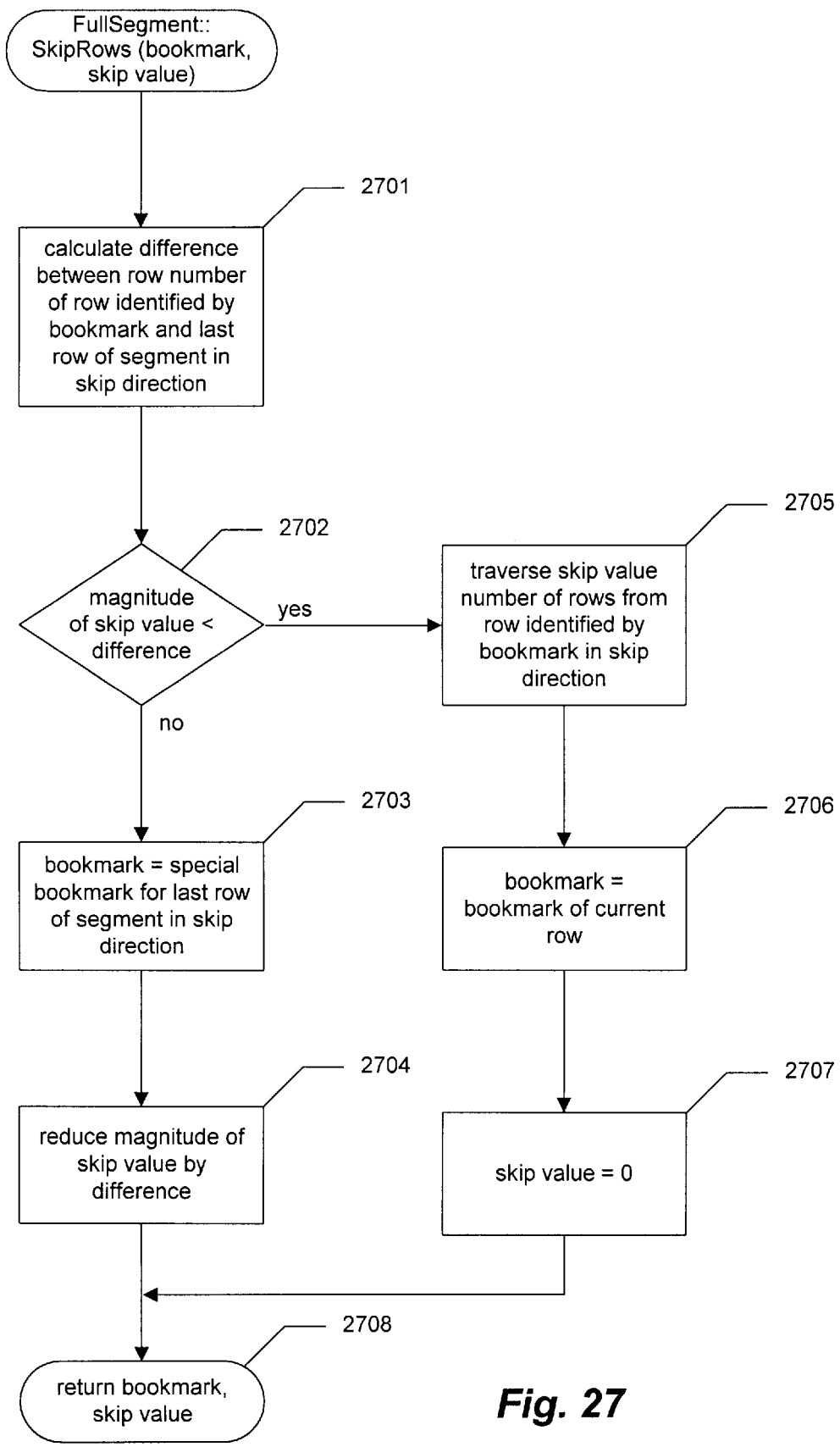
FIG. 27 is a flow diagram depicting the FullSegment::SkipRows method.

FIG. 27 is a flow diagram depicting the implementation of the FullSegment::SkipRows method. This method takes as its parameters a bookmark identifying the row at which to begin skipping and a signed skip value indicating the number of rows to skip over, either forward or backward. In step 2701, the FullSegment::SkipRows method calculates the difference between the row number of the row identified by the specified bookmark and the last row of the segment in the skip direction. This difference constitutes the maximum number of rows that may be skipped within the present segment. In step 2702, if the magnitude of the skip value is less than this difference, then the FullSegment::SkipRows method continues in step 2705, else the FullSegment::SkipRows method continues in step 2703. In step 2703, the FullSegment::SkipRows method sets the current bookmark equal to a special bookmark identifying the last row of the present segment in the skip direction in order to skip all of the rows of the present segment. In step 2704, the FullSegment::SkipRows method reduces the magnitude of the skip value by the calculated difference. After step 2704, the FullSegment::SkipRows method continues in step 2708.

In step 2705, the FullSegment::SkipRows method traverses a number of rows equal to the skip value from the row identified by the specified bookmark in the skip direction. In step 2706, the FullSegment::SkipRows method sets the current bookmark equal to the bookmark of the current row, thereby skipping the number of rows specified by the skip value. In step 2707, the FullSegment::SkipRows method sets the remaining skip value equal to zero.

In step 2708, the FullSegment::SkipRows method returns the bookmark of the current row and the remaining skip value.

Figure 28:
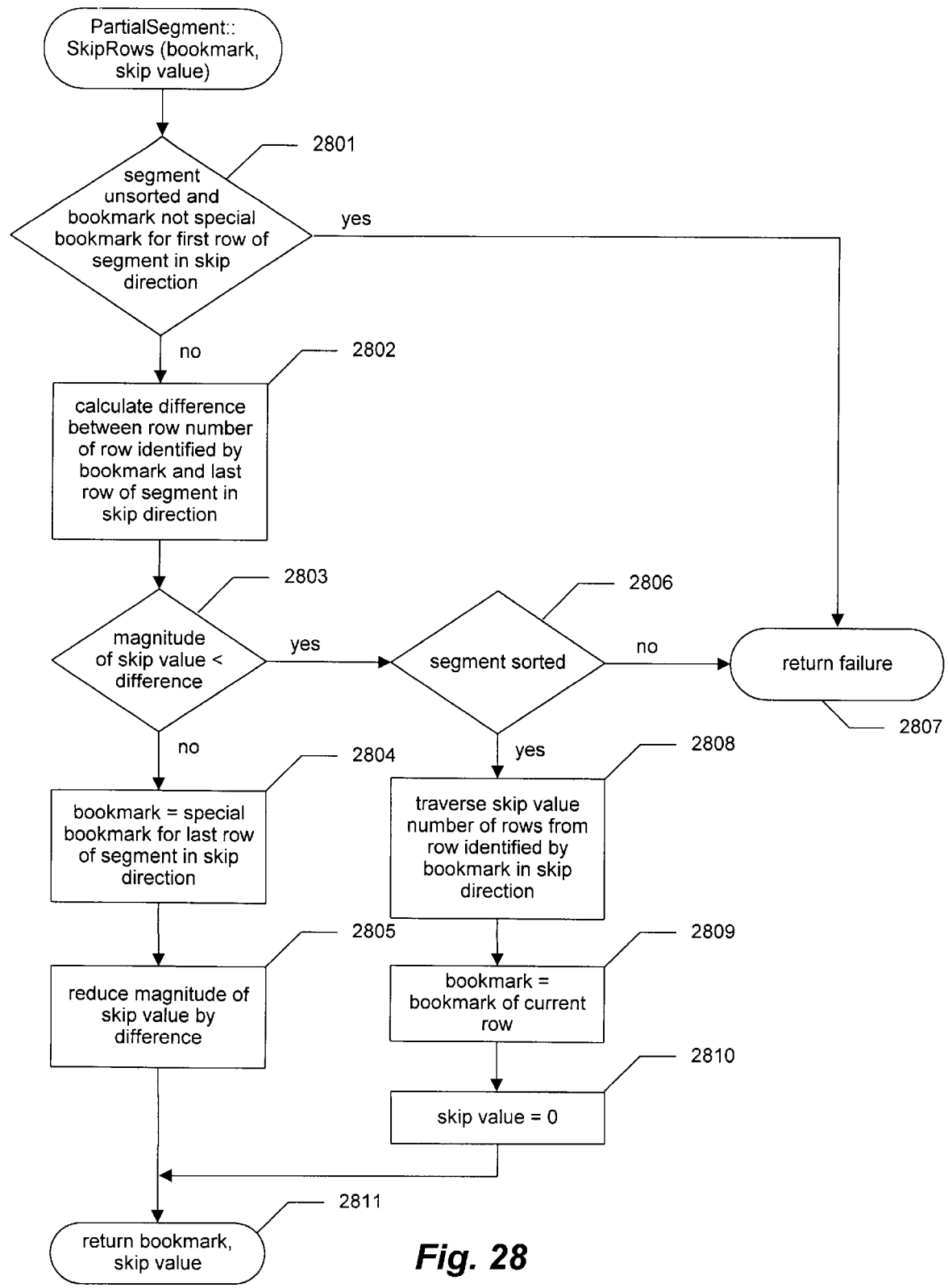
FIG. 28 is a flow diagram depicting the implementation of the PartialSegment::SkipRows method.

FIG. 28 is a flow diagram depicting the implementation of the PartialSegment::SkipRows method. This method takes as its parameters a bookmark identifying the row at which to begin skipping and a signed skip value indicating the number of rows to skip over, either forward or backward. In step 2801, if the current segment is unsorted, i.e., if the value of the "sorted" flag 1045 (FIG. 10) is FALSE, and the specified bookmark is not the special bookmark identifying the first row of the segment in the skip direction, then it is impossible to skip the partial segment without converting it to a full segment, and the PartialSegment::SkipRows method continues in step 2807 to return failure, else the PartialSegment::SkipRows method continues in step 2802. In step 2802, the PartialSegment::SkipRows method calculates the difference between the row number of the row identified by the specified bookmark and the last row of the segment in the skip direction. This difference constitutes the maximum number of rows that may be skipped within the present segment. In step 2803, if the magnitude of the skip value is less than this difference, then the PartialSegment::SkipRows method continues in step 2806, else the PartialSegment::SkipRows method continues in step 2804. In step 2804, the PartialSegment::SkipRows method sets the current bookmark equal to a special bookmark identifying the last row of the present segment in the skip direction in order to skip all of the rows of the present segment. In step 2805, the PartialSegment::SkipRows method reduces the magnitude of the skip value by the calculated difference. After step 2805, the PartialSegment::SkipRows method continues in step 2811.

In step 2806, the current segment is sorted, i.e., if the value of the "sorted" flag 1045 (FIG. 10) is TRUE, then less than the entire segment can be skipped by traversing the sorted bookmark list and the PartialSegment::SkipRows method continues in step 2808, else less than the entire segment cannot be skipped and the PartialSegment::SkipRows method continues in step 2807. In step 2807, because the PartialSegment::SkipRows method was unable to skip rows in the current segment, the PartialSegment::SkipRows method returns failure. In response, the Table::Skip method converts the partial segment into a full segment and invokes the FullSegment::SkipRows method.

In steps 2808–2810, the PartialSegment::SkipRows method skips rows of the partial segment by traversing the sorted bookmark list. In step 2808, the PartialSegment::SkipRows method traverses a number of rows equal to the skip value from the rows identified by the specified bookmark in the skip direction. In step 2809, the PartialSegment::SkipRows method sets the current bookmark equal to the bookmark of the current row thereby skipping the number of rows specified by the skip value. In step 2810, the PartialSegment::SkipRows method sets the remaining skip value equal to 0. In step 2811, the PartialSegment::SkipRows method returns the current bookmark and skip value, reflecting the rows skipped.

Figure 29:
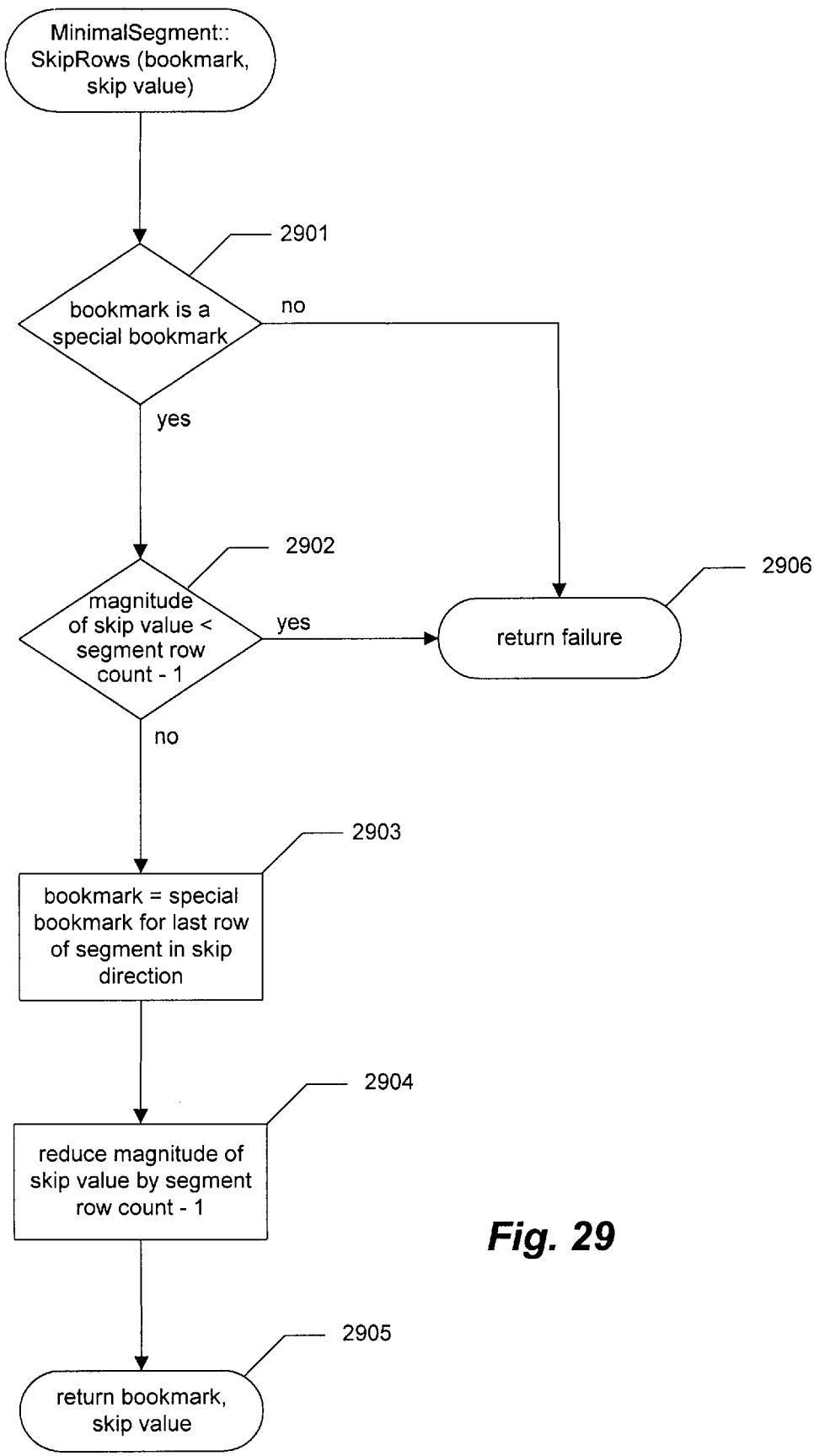
FIG. 29 is a flow diagram depicting the implementation of the MinimalSegment::SkipRows method.

FIG. 29 is flow diagram depicting the implementation of the MinimalSegment::SkipRows method. This method takes as its parameters a bookmark identifying the row at which row skipping will begin, and a signed skip value indicating the number of rows to skip over in either the forward or backward direction. In step 2901, if the specified bookmark is a special bookmark identifying either the first or last row of the present segment, then it may be possible to skip the minimal segment without converting it to a full segment and the MinimalSegment::SkipRows method continues in step 2902, else the MinimalSegment::SkipRows method continues in step 2906. In step 2902, if the magnitude of the skip value is less than the segment row count minus one, then the entire segment cannot be skipped and the MinimalSegment::SkipRows method continues at step 2906, else the entire minimal segment can be skipped and the MinimalSegment::SkipRows method continues at step 2903. In steps 2903–2904, the MinimalSegment::SkipRows method skips all of the rows of this segment. In step 2903, the MinimalSegment::SkipRows method sets the current bookmark equal to a special bookmark identifying the last row of the present segment in the skip direction in order to skip the entire minimal segment. In step 2904, the MinimalSegment::SkipRows method reduces the magnitude of the skip value by the segment row count minus one. In step 2905, the MinimalSegment::SkipRows method returns the current bookmark and skip value.

In step 2906, the MinimalSegment::SkipRows method is unable to skip rows in the minimal segment object, and returns an indication of failure to the Table::GetRowsAtBookmark method. In response, the Table::GetRowsAtBookmark method converts the minimal segment object into a full segment object and invokes the FullSegment::SkipRows method on the new full segment object.

Figure 30:
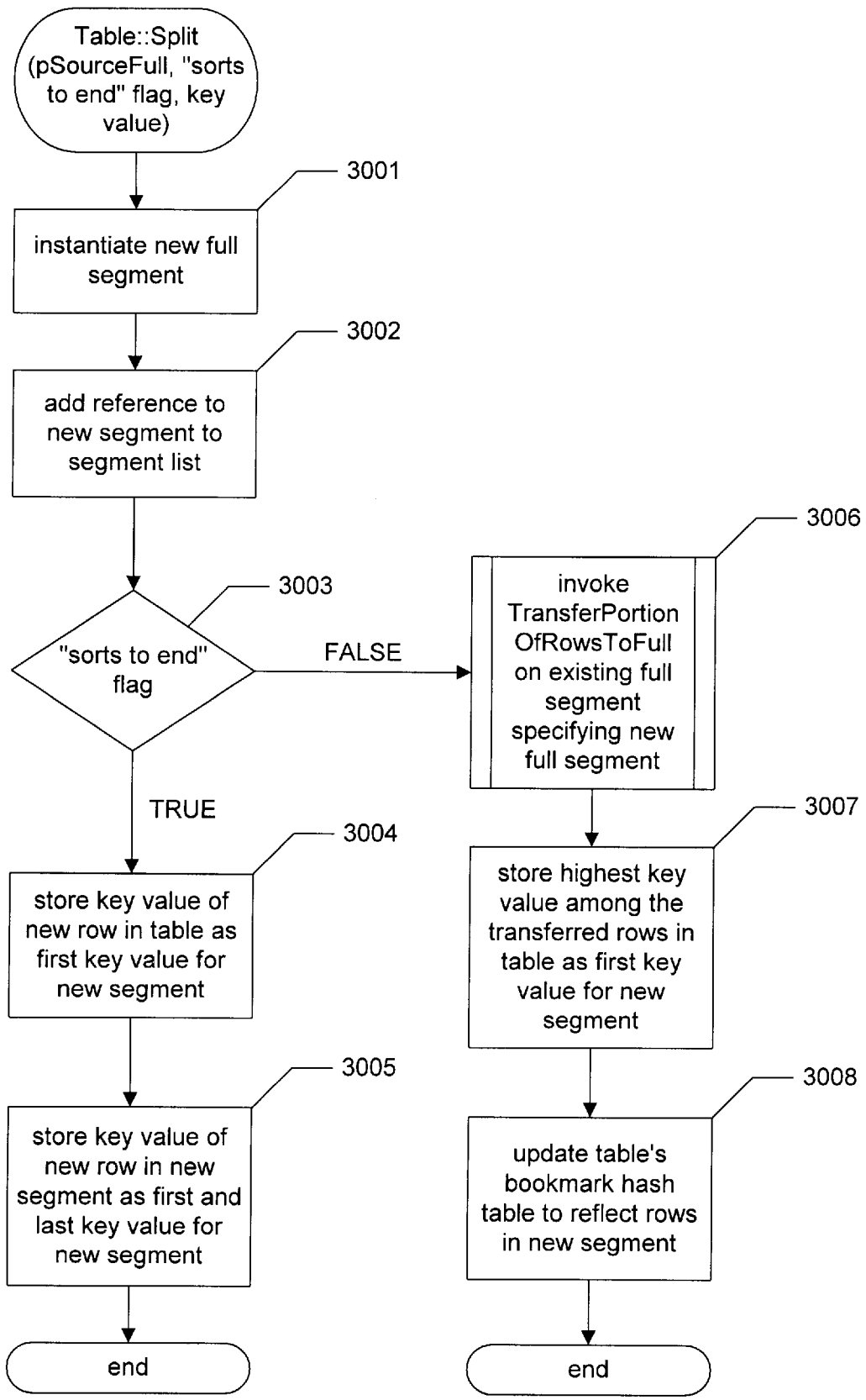
FIG. 30 is a flow diagram depicting the implementation of the Table::Split method.

FIG. 30 is a flow diagram depicting the implementation of the Table::Split method. This method takes as parameters a pointer to the full segment to divide, a "sorts to end" flag indicating whether the new row data is to be added to the end of the segment, and the key value of the row whose addition caused the segment split. The Table::Split method is invoked by the Table::PutRows method to divide the specified segment into two smaller segment objects when the specified segment object reaches a maximum number of rows. While FIG. 30 shows the division of the specified segment object into two separate segment objects, in an alternative embodiment, the Table::Split method divides the specified segment object into a larger number of separate segment objects.

In step 3001, the Table::Split method instantiates a new full segment object, e.g., new segment object 760 (FIG. 7). In step 3002, the Table::Split method adds a reference to the new segment instantiated in step 3001 to the segment list 711. In step 3003, if the "sorts to end" flag is set to TRUE, then the Table::Split method continues at step 3004 to leave all of the rows of the original segment in the original segment, else the Table::Split method continues at step 3006 to divide the rows of the original segment object between the original segment object and the new segment object. In step 3004, the Table::Split method stores the key value of the new row passed to the Table::Split method as a parameter in the table as the first key value for the new segment in first key value table 712 (FIG. 7). In step 3005, the Table::Split method stores the key value of the new row in segment object 760 as both the first key value 761 of the new segment object and the last key value 762 of the new segment object. After step 3005, the Table::Split method returns.

In step 3006, the Table::Split method invokes the TransferPortionOfRowsToFull method on the original full segment object specifying the new full segment object in order to transfer the second half of the rows of the original segment object to the new segment object. In step 3007, the Table::Split method stores the highest key value among the rows transferred to the new segment as the first key value for the new segment object to the first key value array 712 of the table object 710 (FIG. 7). In step 3008, the Table::Split method updates the bookmark hash table 713 of the table object 710 to reflect the rows added to the new full segment object by the TransferPortionOfRowsToFull method invocation in step 3006. The Table::Split method then returns.

Figure 31:
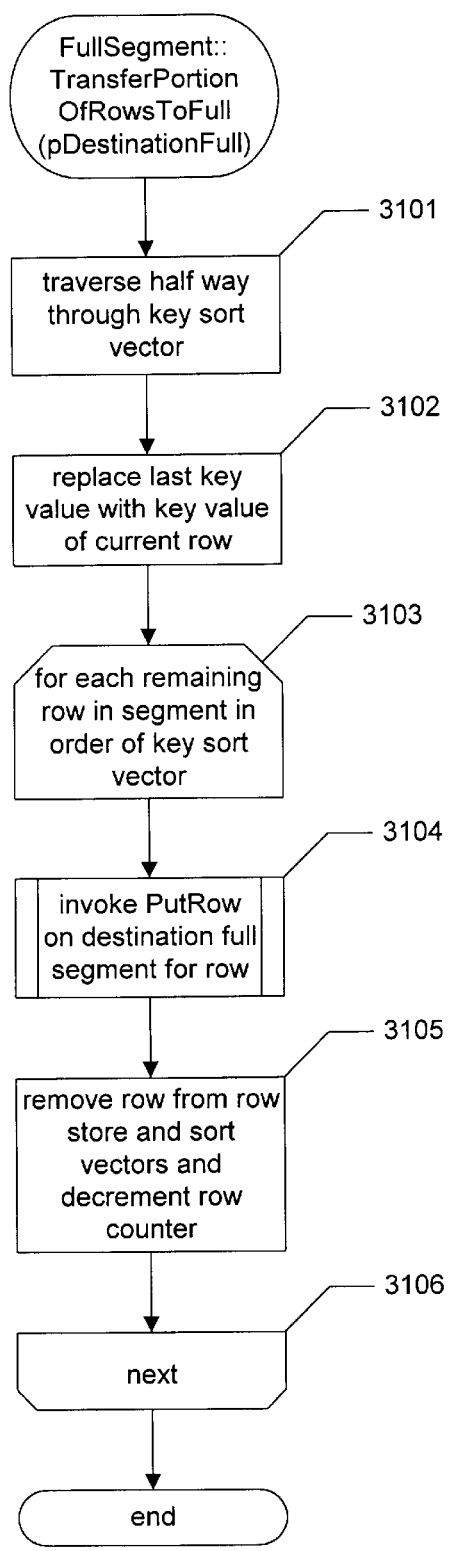
FIG. 31 is a flow diagram depicting the implementation of the FullSegment::TransferPortionOfRowsToFull method.

FIG. 31 is a flow diagram depicting the implementation of the FullSegment::TransferPortionOfRowsToFull method. The FullSegment::TransferPortionOfRowsToFull method takes as a parameter a pointer to a full segment to which rows are to be transferred, and is invoked on a full segment from which rows are to be transferred by the Table::Split method. In step 3101, the FullSegment::TransferPortionOfRowsToFull method traverses halfway through the key sort vector 692 of the transferor full segment object 640 (FIG. 6). In step 3102, the FullSegment::TransferPortionOfRowsToFull method replaces the last key value 641 of the transferor segment object 640 (FIG. 6) with the key value of the current row following the traversal in step 3101. In steps 3103–3106, the FullSegment::TransferPortionOfRowsToFull method loops through each remaining row in the transferor segment object, beginning with the next row after the row whose key value was stored as the last key value 641 in step 3102, in the order of the key sort vector. In step 3104, the FullSegment::TransferPortionOfRowsToFull method invokes the PutRow method on the transferee full segment object to add this remaining row of the transfer or full segment to the transferee full segment. In step 3105, the FullSegment::TransferPortionOfRowsToFull method removes the current row from the row store and sort vector of the transferor full segment object, and decrements the segment row counter of the transferor full segment object. In step 3106, if additional rows remain in the transferor full segment object, then the FullSegment::TransferPortionOfRowsToFull method continues at step 3103 to transfer another row, else the FullSegment::TransferPortionOfRowsToFull method returns.

Figure 32:
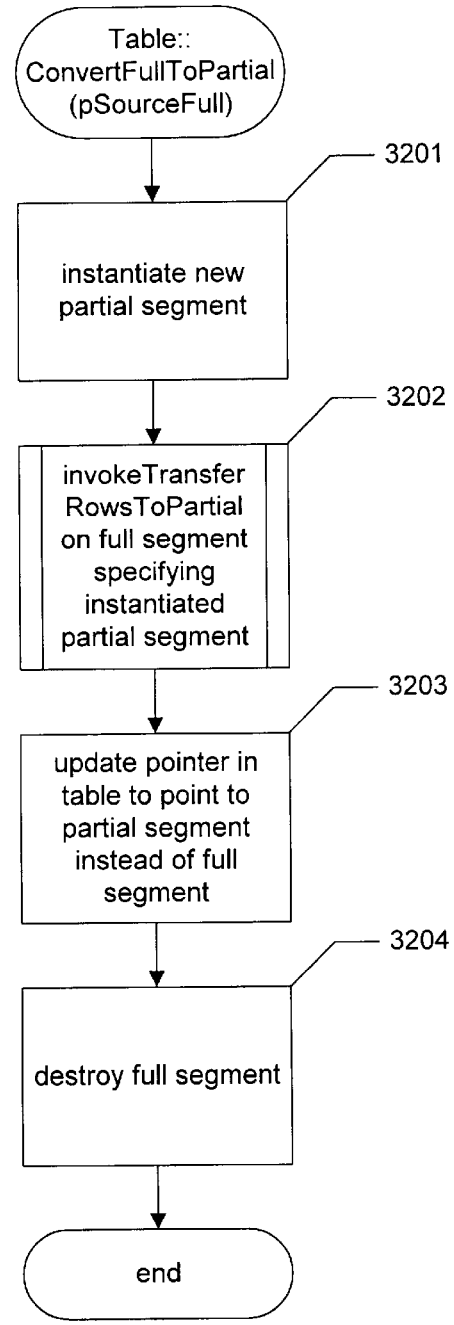
FIG. 32 is a flow diagram depicting the implementation of the Table::ConvertFullToPartial method.

FIG. 32 is a flow diagram depicting the implementation of the Table::ConvertFullToPartial method. The Table::ConvertFullToPartial method takes as a parameter a pointer to a full segment to be converted, is invoked by the Table::CheckAndAdjustMemoryUsage method specifying a full segment object to reduce its size by converting it to a partial segment object. In step 3201, the Table::ConvertFullToPartial method instantiates a new partial segment object. In step 3202, the Table::ConvertFullToPartial method invokes the TransferRowsToPartial method on the full segment object specifying the new partial segment object, in order to move the rows of the full segment object to the new partial segment object. In step 3203, the FullSegment::ConvertToPartial method updates the pointer in the segment object list 911 that formerly pointed to the full segment object to point instead to the new partial segment object 940 (FIG. 9). In step 3204, the FullSegment::ConvertToPartial method destroys the full segment object. These steps then conclude.

In an alternative embodiment, the Table::ConvertFullToPartial method converts the full segment to a partial segment by merely sorting the bookmark column 481 of the full segment 440 by key value using the key sort vector 492, then discarding the sort vectors 491 and 492 and the row data columns other than the bookmark column 481 (FIG. 4) (not shown).

Figure 33:
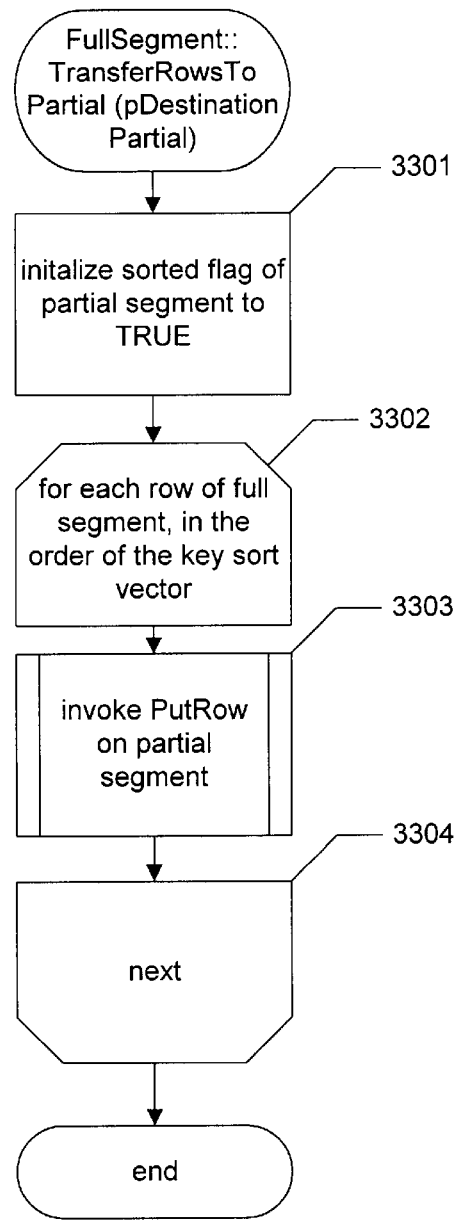
FIG. 33 is a flow diagram depicting the implementation of the FullSegment::TransferRowsToPartial method.

FIG. 33 is a flow diagram depicting the implementation of the FullSegment::TransferRowsToPartial method. The FullSegment::TransferRowsToPartial method takes as its parameter a pointer to a destination partial segment object to which rows of the full segment object are to be transferred, and is invoked by the Table::ConvertFullToPartial method to transfer these rows. In step 3301, the FullSegment::TransferRowsToPartial method initializes the sorted flag 1045 of the new partial segment object 1040 to TRUE (FIG. 10). In steps 3302–3304, the FullSegment::TransferRowsToPartial method loops through each row of the full segment object in the order of the key sort vector, invoking the PutRow method on the specified partial segment object for each row with the "sorts to end" flag TRUE. These steps then conclude.

Figure 34:
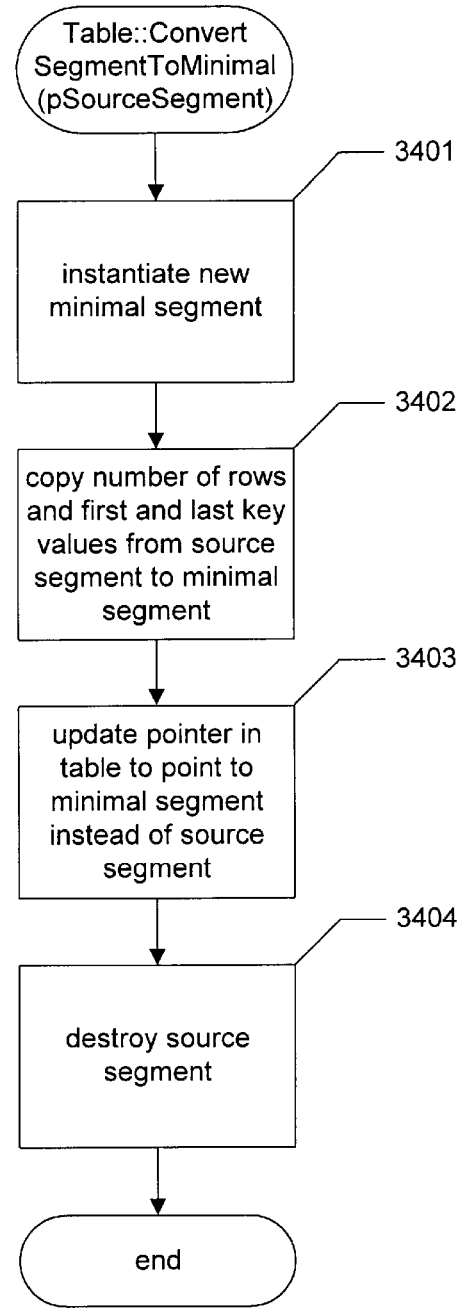
FIG. 34 is a flow diagram depicting the implementation of the Table::ConvertSegmentToMinimal method.

FIG. 34 is a flow diagram depicting the implementation of the Table::ConvertSegmentToMinimal method. This method is invoked by the Table::CheckAndAdjustMemoryUsage method for a full or partial segment object to reduce the size of the full or partial source segment object by converting the source segment object to a minimal segment object. In step 3401, the Table::ConvertSegmentToMinimal method instantiates a new minimal segment object. In step 3402, the Table::ConvertSegmentToMinimal method copies the number of rows and first and last key values from the source segment object to the minimal segment object instantiated in step 3401. In step 3403, the Table::ConvertSegmentToMinimal method updates the pointer in the segment object list 1111 that formerly pointed to the source segment object to instead point to the minimal segment object 1140 (FIG. 11). In step 3404, the Table::ConvertSegmentToMinimal method destroys the source segment object. The Table::ConvertSegmentToMinimal method then returns.

Figure 35:
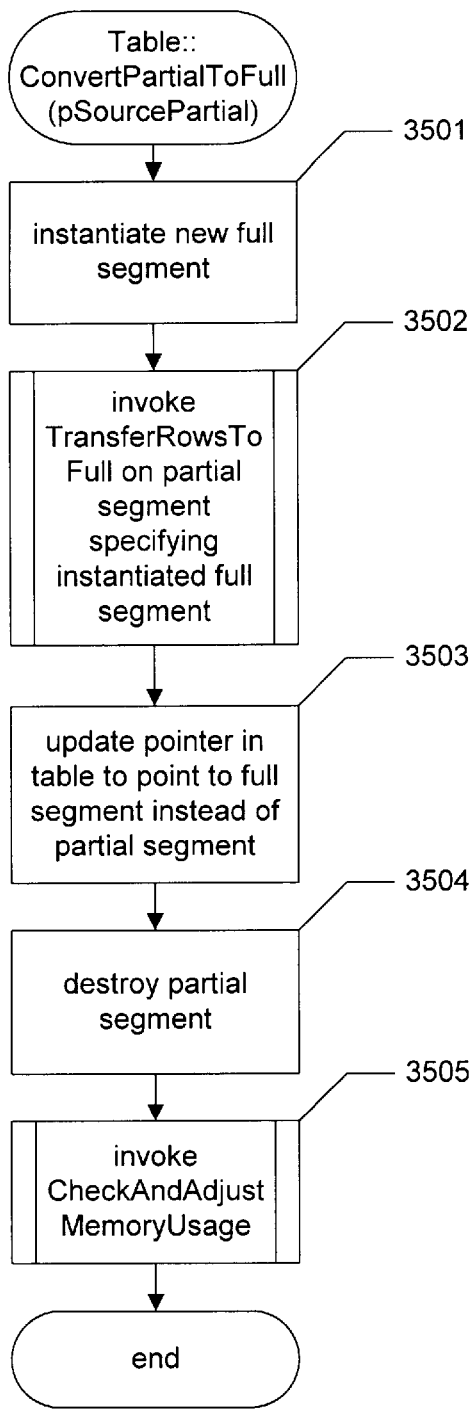
FIG. 35 is a flow diagram depicting the implementation of the Table::ConvertPartialToFull method.

FIG. 35 is a flow diagram depicting the implementation of the Table::ConvertPartialToFull method. This method is invoked by a row retrieval method of the table object specifying a partial segment that is the subject of a pending row retrieval request in order to convert the partial to a full segment object for row data retrieval. In step 3501, the Table::ConvertPartialToFull method instantiates a new full segment object. In step 3502, the Table::ConvertToFull method invokes the TransferRowsToFull method on the specified partial segment object specifying the full segment object instantiated in step 3501 in order to transfer the rows of the partial segment object to the full segment object. In step 3503, the Table::ConvertPartialToFull method updates the pointer in the segment object list 911 that formerly pointed to the partial segment object to point instead to the full segment object instantiated in step 3501. In step 3504, the Table::ConvertPartialToFull method destroys the partial segment. In step 3505, the Table::ConvertPartialToFull method invokes the CheckAndAdjustMemoryUsage method of the table object to determine whether conversion of the segment object has caused the total memory used to exceed a maximum threshold, and, if so, to reduce the total memory used. The Table::ConvertPartialToFull method then returns.

Figure 36:
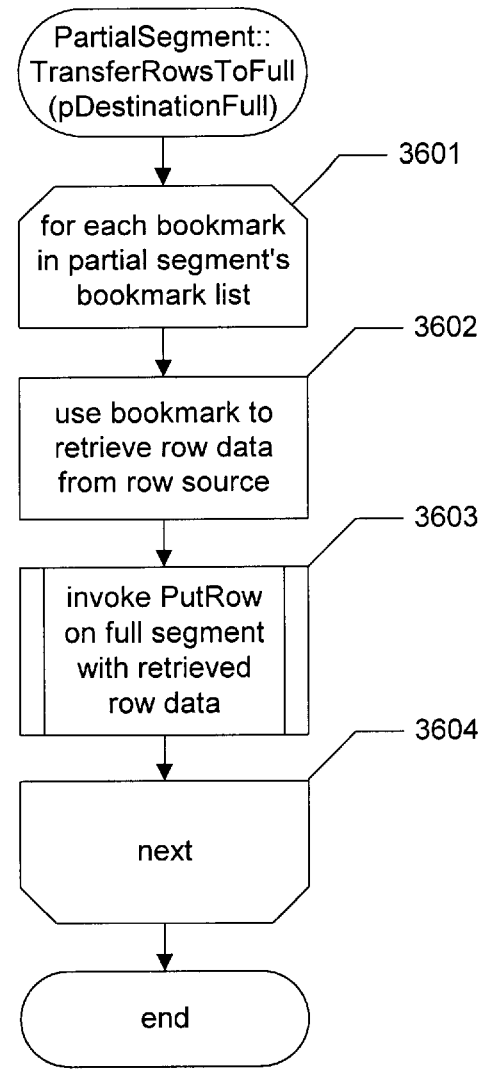
FIG. 36 is a flow diagram depicting the implementation of the PartialSegment::TransferRowsToFull method.

FIG. 36 is a flow diagram depicting the implementation of the PartialSegment::TransferRowsToFull method. This method is invoked by the Table::ConvertPartialToFull method specifying a destination full segment object to which to transfer the rows of a partial segment. In steps 3601–3604, the PartialSegment::TransferRowsToFull method loops through each bookmark in the bookmark list 1081 of the partial segment object 1040 (FIG. 10) in the order of the bookmark list. In step 3602, the PartialSegment::TransferRowsToFull method uses the bookmark to retrieve the row data corresponding to the bookmark from the row source program. In step 3603, the PartialSegment::TransferRowsToFull method invokes the PutRow method on the full segment object to transfer the row to the full segment object. If the "sorted" flag of the partial segment is TRUE, the invocation of the PutRow method in step 3603 passes in a TRUE value for the "sorts to end" flag parameter. In step 3604, the PartialSegment::TransferRowsToFull method loops back to step 3601 to process the next bookmark in the bookmark list of the partial segment. The PartialSegment::TransferRowsToFull method then returns.

Figure 37:
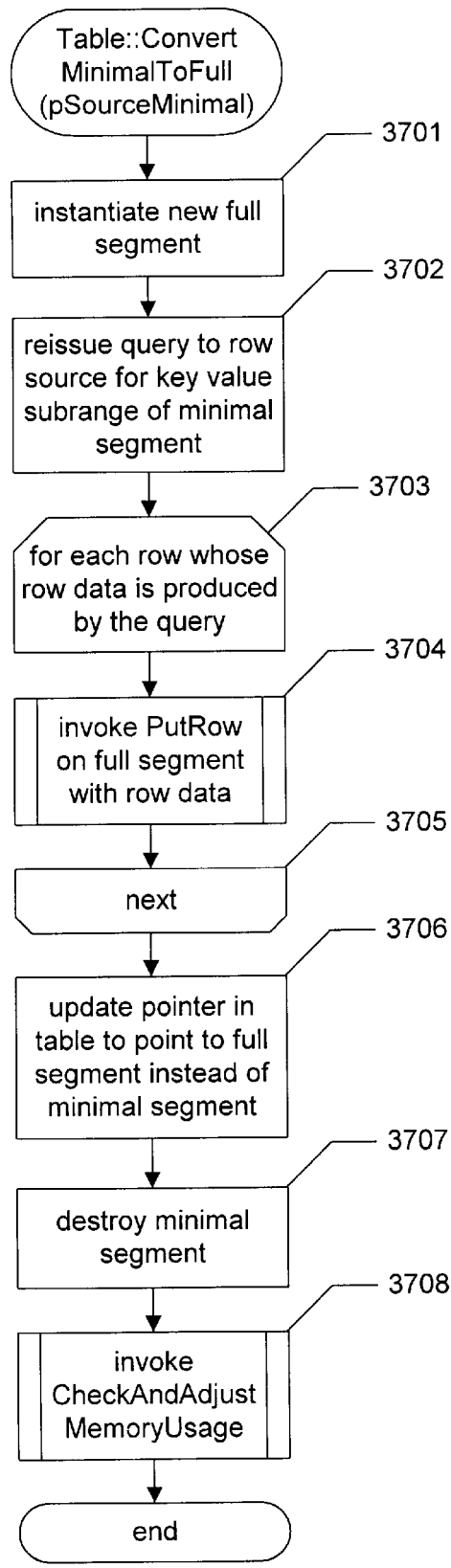
FIG. 37 is a flow diagram depicting the implementation of the Table::ConvertMinimalToFull method.

FIG. 37 is a flow diagram depicting the implementation of the Table::ConvertMinimalToFull method. This method is invoked by a row retrieval method of the table object specifying a minimal segment that is the subject of a pending row retrieval request to convert the specified minimal segment object into a full segment object for row data retrieval. In step 3701, the Table::ConvertMinimalToFull method instantiates a new full segment object. In step 3702, the Table::ConvertMinimalToFull method reissues the query originally issued by the row sink program to the row source program for the key value subrange of the minimal segment object, i.e., from the first key value 1241 to the last key value 1242 of the minimal segment object 1240 (FIG. 12). In an alternative embodiment in which the bookmark hash table 1113 (FIG. 11) is used, in step 3702, the implementation of the Table::ConvertMinimalToFull method instead iterates over the bookmark hash table to identify the bookmarks represented by the segment instead of reissuing the query as shown.

In steps 3703–3705, the Table::ConvertMinimalToFull method loops through each row whose row data is produced by the query reissued in step 3702, invoking the PutRow method on the full segment object instantiated in step 3701 for that row data. In step 3706, the Table::ConvertMinimalToFull method updates the pointer in the segment object list 1111 (FIG. 11) that formerly pointed to the minimal segment object to point instead to the full segment object instantiated in step 3701. In step 3707, the Table::ConvertMinimalToFull method destroys the minimal segment. In step 3708, the Table::ConvertMinimalToFull method invokes the CheckAndAdjustMemoryUsage method of the table object to determine whether adding the new row to the segment object has caused the total memory used to exceed a maximum threshold, and, if so, to reduce the total memory used. The Table::ConvertMinimalToFull method then returns.

The FullSegment::Split, PartialSegment::ConvertToFull, and MinimalSegment::ConvertToFull methods each instantiate a new full segment object. In place of or in addition to invoking the Table::CheckAndAdjustMemoryUsage method each time the facility increases its use of memory, the facility preferably attempts to reduce the amount of memory consumed by the facility each time a new full segment object is instantiated (not shown). In accordance with this alternative embodiment, when a new full segment object is instantiated, the facility attempts to convert any suitable full segment objects to partial segment objects. Suitable segment objects are those that are generally unlikely to be the subject of future row retrieval operations and include those that: are not among the last few segment objects to be the subject of row retrieval requests; are not presently being converted from partial or minimal segment objects to full segment objects; are not surrounded by partial or minimal segment objects; are not the first or last table object segment object in the key order; and have at least a minimum number of rows, based on the number of rows typically utilized by the row sink program, such as 103 rows. This conversion of full segment objects to partial segment objects is preferably performed only if the table object contains at least a minimum number of segment objects, such as 5.

The Table::ConvertPartialToFull and Table::ConvertMinimalToFull methods as shown and discussed above proceed by converting the source partial or minimal segment into a single full segment. For especially large source segments, however, these methods preferably convert the source segment into an auxiliary table object, which may comprise several destination segments of different types. The table then replaces the source segment with these destination segments of the auxiliary table object.

Conclusion

While the invention has been shown and described with reference to preferred embodiments, it will be understood by those skilled in the art that various changes or modifications in form and detail may be made without departing from the scope of the invention. For example, while some of the specific table management techniques detailed above are described with respect to a single autonomous database engine, those skilled in the art will appreciate that the facility could instead receive rows from any kind of row source program, that is, any program for providing rows, including multiple and heterogeneous row source programs. Further, while some of the table segment conversion techniques discussed above constitute optimizations tailored to database front-ends having a graphical user interface, those skilled in the art will appreciate that the facility may be straightforwardly adapted to provide result rows to any row sink program, i.e., any program for receiving rows. Those skilled in the art will also recognize that minimal segments may be used to manage the size of the result set without using partial segments, and that partial segments may be used to manage the size of the result set without using minimal segments. Those skilled in the art will further appreciate that the invention, while described above as implemented using object-oriented techniques, could be straightforwardly implemented using various other programming techniques, including procedural programming techniques. Further, while full segment objects are described above as being divided into two segment objects when they grow too large, such full segment objects can be straightforwardly divided into any appropriate number of segment objects.

We claim:

1. A method in a computer system for managing the size of a result set produced in response to a database query, the result set comprising a plurality of rows each having information including a sort key, the sort keys of all of the rows of the result set together comprising a sort key range, the method comprising the steps of:

dividing the rows of the result set into a plurality of segments, each segment being either a full segment containing complete information for each of its rows or an abridged segment containing incomplete information for each of its rows, the sort keys of the rows of each segment comprising a sort key subrange within the sort key range, such that the sort key subranges of the segments are non-overlapping;

selecting a segment to abridge based on a likelihood of receiving a request for complete information for one of the rows in the segment; and abridging the selected segment by discarding at least a portion of the information for each row of the selected segment, such that the size of the selected segment and the size of the result set as a whole are both reduced.

2. The method of claim 1 wherein the selecting and abridging steps are performed in response to the addition of a new row to one of the segments.

3. The method of claim 1 wherein the selecting and abridging steps are performed in response to a request to reduce the size of the result set.

4. The method of claim 1 wherein the selected segment contains summary information generally characterizing the rows of the segment as a group in addition to row information relating to specific rows, and wherein the abridging step discards all the row information in the selected segment, such that only the summary information remains in the selected segment.

5. The method of claim 4 wherein the selected segment is a full segment containing complete information for each of its rows.

6. The method of claim 4 wherein the selected segment is an abridged segment containing incomplete information for each of its rows.

7. The method of claim 1 wherein the selecting and abridging steps are performed in response to the step of determining that the size of the result set as a whole has exceeded a predetermined maximum size.

8. The method of claim 1 wherein the selecting step selects the selected segment based on a comparison of the likelihood of receiving a request for complete information for one of the rows in the selected segment to a threshold likelihood.

9. The method of claim 1 wherein the information for all of the rows of the selected segment is divided into a plurality of columns, and wherein the abridging step discards a subset of the columns for all of the rows in the selected segment.

10. A method in a computer system for managing the size of a result set produced in response to a database query, the result set comprising a plurality of rows each having information including a sort key, the sort keys of all of the rows of the result set together comprising a sort key range, the method comprising the steps of:

dividing the rows of the result set into a plurality of segments, each segment being either a full segment containing complete information for each of its rows or an abridged segment containing incomplete information for each of its rows, the sort keys of the rows of each segment comprising a sort key subrange within the sort key range, such that the sort key subranges of the segments are non-overlapping;

selecting a segment to abridge based on a likelihood of receiving a request for complete information for one of the rows in the segment; and abridging the selected segment by discarding at least a portion of the information for each row of the selected segment, such that the size of the selected segment and the size of the result set as a whole are both reduced, wherein the information for all of the rows of the selected segment is divided into a plurality of columns including a bookmark column containing, for each row, information usable to efficiently obtain complete information for the row, and wherein the abridging step discards, for each row in the selected segment, all of the columns except the bookmark column.

11. The method of claim 1 wherein the likelihood is based on recency in which complete information for a row of the selected segment has been requested.

12. The method of claim 1 wherein the selecting step selects a segment from which complete information for a row has been requested less recently than at least a predetermined number of other segments.

13. The method of claim 1 wherein the selecting step selects a segment, such that, after the selected segment is abridged in the abridging step, the sort key subranges of the full segments are substantially evenly distributed within the sort key range.

14. The method of claim 1 wherein the selecting step selects a full segment whose sort key subrange is the middle of three consecutive subranges each corresponding to a full segment.

15. The method of claim 1 wherein the plurality of segments includes a first segment whose sort key subrange contains sort keys less than or equal to the sort keys contained by the other sort key subranges and a last segment whose sort key subrange contains sort keys greater than or equal to the sort keys contained by the other sort key subranges, and wherein the selecting step selects a segment other than the first and the last segments.

16. The method of claim 1 wherein the selecting step selects a segment containing more than a predetermined minimum number of rows.

17. The method of claim 1, further including the step of determining that an identified segment will not be the subject of future requests for complete information, and wherein the selecting step selects the identified segment.

18. The method of claim 1, further comprising the steps of:

identifying a segment that has exceeded a predetermined size; and in response to the identifying step, dividing the rows of the identified segment into a plurality of segments.

19. The method of claim 18 wherein the dividing step divides the rows of the identified segment into two segments.

20. The method of claim 19 wherein the identifying step is performed in response to a step of adding a new row to the identified segment, and wherein the step of dividing the rows of the identified segment into two segments assigns the new row to a first of the two segments and assigns the other rows of the identified segment to a second of the two segments.

21. The method of claim 18 wherein the identifying step identifies a segment having greater than a predetermined maximum number of rows.

22. The method of claim 1, further comprising the steps of:

receiving a request for the complete information of a specified row in a specified segment;

if the specified segment is incomplete, retrieving into the specified segment the complete information for the rows of the specified segment; and in response to the received request, returning the complete information for the specified row from the specified segment.

23. A method in a computer system for managing the size of a result set produced in response to a database query, the result set comprising a plurality of rows each having information including a sort key, the sort keys of all of the rows of the result set together comprising a sort key range, the method comprising the steps of:

dividing the rows of the result set into a plurality of segments, each segment being either a full segment containing complete information for each of its rows or an abridged segment containing incomplete information for each of its rows, the sort keys of the rows of each segment comprising a sort key subrange within the sort key range, such that the sort key subranges of the segments are non-overlapping;

selecting a segment to abridge based on a likelihood of receiving a request for complete information for one of the rows in the segment;

abridging the selected segment by discarding at least a portion of the information for each row of the selected segment, such that the size of the selected segment and the size of the result set as a whole are both reduced;

receiving a request for the complete information of a specified row in a specified segment;

if the specified segment is incomplete, retrieving into the specified segment the complete information for the rows of the specified segment; and in response to the received request, returning the complete information for the specified row from the specified segment, wherein the information for the rows of the specified segment contained in the specified segment includes, for each row, a bookmark usable to efficiently obtain complete information for the row, and wherein the retrieving step includes the step of using the bookmarks to efficiently obtain complete information for the rows of the specified segment.

24. The method of claim 22 wherein the selected segment contains summary information generally characterizing the rows of the segment in addition to row information, and wherein the abridging step discards all the row information in the selected segment, such that only the summary information remains in the selected segment, and wherein the retrieving step includes reexecuting the database query for the sort key subrange of the specified segment.

25. The method of claim 1, further comprising the steps of:
- receiving a request for the complete information of a specified row in a specified segment whose sort keys cumulatively approach the sort key subrange of an adjacent segment;
- determining whether the adjacent segment is incomplete; and
- if the adjacent segment is incomplete, retrieving into the adjacent segment the complete information for the rows of the adjacent segment in response to the request for complete information for rows of the specified segment.

26. The method of claim 25, further comprising the step of processing the received request, and wherein the retrieving step is performed asynchronously with the processing step.

27. The method of claim 1, further comprising the steps of:
- receiving a request for the complete information of a specified number of rows beginning in a specified row of a specified segment and proceeding in a specified direction; and
- in response to the receiving step:
  - returning complete information for the rows from the specified row to the last row of the specified segment in the specified direction of retrieval,
  - determining that the number of rows returned from the specified segment is smaller than the specified number of rows, and that the segment adjacent to the specified segment in the specified direction of retrieval is incomplete,
  - retrieving into the adjacent segment the complete information for the rows of the adjacent segment, and
  - after the retrieving step, returning complete information for rows of the adjacent segment in order to complete the received request.

28. A computer-readable medium whose contents cause a computer system to manage the size of a result set, the result set comprising a plurality of rows each having information including a sort key, the sort keys of all of the rows of the result set together comprising a sort key range, by performing the steps of:
- dividing the rows of the result set into a plurality of segments, each segment being either a full segment containing complete information for each of its rows or an abridged segment containing incomplete information for each of its rows, the sort keys of the rows of each segment comprising a distinct sort key subrange within the sort key range;
- when each new row is received for the result set, adding the new row to a segment whose subrange encompasses the sort key of the new row;
- in response to the adding step, selecting a segment to abridge based on the relative likelihood of, for each segment, receiving a request for complete information for one of the rows in the segment, which corresponds to the likelihood of, for each segment, receiving a request for complete information for a row whose sort key is encompassed by the sort key subrange of the segment; and
- abridging the selected segment by discarding at least a portion of the information for each row of the selected segment, such that the size of the selected segment and the size of the result set as a whole are both reduced.

29. The computer-readable medium of claim 28 wherein the information for all of the rows of the selected segment is divided into a plurality of columns, and wherein the abridging step discards a subset of the columns for all of the rows in the selected segment.

30. A computer-readable medium whose contents cause a computer system to manage the size of a result set, the result set comprising a plurality of rows each having information including a sort key, the sort keys of all of the rows of the result set together comprising a sort key range, by performing the steps of:
- dividing the rows of the result set into a plurality of segments, each segment being either a full segment containing complete information for each of its rows or an abridged segment containing incomplete information for each of its rows, the sort keys of the rows of each segment comprising a distinct sort key subrange within the sort key range;
- when each new row is received for the result set, adding the new row to a segment whose subrange encompasses the sort key of the new row;
- in response to the adding step, selecting a segment to abridge based on the relative likelihood of, for each segment, receiving a request for complete information for one of the rows in the segment, which corresponds to the likelihood of, for each segment, receiving a request for complete information for a row whose sort key is encompassed by the sort key subrange of the segment; and
- abridging the selected segment by discarding at least a portion of the information for each row of the selected segment, such that the size of the selected segment and the size of the result set as a whole are both reduced,
- wherein the information for all of the rows of the selected segment is divided into a plurality of columns including a bookmark column containing, for each row, information usable to efficiently obtain complete information for the row, and wherein the abridging step discards, for each row in the selected segment, all of the columns except the bookmark column.

31. A method in a computer system for managing the size of a representation of a result set produced by a row source program, the representation of the result set comprising an ordered plurality of rows, at least some of the rows containing row data, each of the rows containing a bookmark usable to retrieve row data for the row, the method comprising the steps of:
- determining that the size of the representation of the result set should be reduced;
- in response to the determining step, identifying a subset of the rows of the representation of the result set that is contiguous within the order of the representation of the result set, at least some of the rows in the identified subset containing row data; and
- removing from the representation of the result set any row data contained by rows among the identified subset while retaining in the representation of the result set the bookmarks contained by rows among the identified subset, such that the size of the representation of the result set is reduced.

32. The method of claim 31 wherein the row source program is a database query engine.

33. The method of claim 31 wherein the row source program is an operating system file system.

34. The method of claim 31, further comprising the steps of:
receiving a request to return the row data for a specified row of the identified subset; and
in response to the receiving step:
using the bookmarks retained in the representation of the result set for rows of the identified subset to restore into the representation of the result set the row data for each row of the identified subset, and
returning the restored row data for the specified row.

35. The method of claim 34 wherein the received request specifies a direction of retrieval and wherein the removing step further removes from the representation of the result set any row data contained by rows among a second identified subset while retaining in the representation of the result set the bookmarks contained by rows among the identified subset, the method further comprising the steps of, in response to the receiving step:
determining, based on the received request, that future receipt of a request to return the row data for a row in a second identified segment is likely, and
in response to the determining step, using the bookmarks retained in the representation of the result set for the rows of the second identified subset to restore into the representation of the result set for the row data for each row of the second identified subset.

36. The method of claim 35 wherein the determining step determines that future receipt of a request to return the row data for a row in the second identified segment is likely because the second identified subset is adjacent to the first identified subset in the direction of retrieval.

37. The method of claim 31, further comprising the steps of:
receiving a request to return the row data for a specified row of the identified subset; and
in response to the receiving step:
using the bookmark retained in the representation of the result set for the specified row to retrieve from the row source program the row data for the specified row, and
returning the retrieved row data.

38. A computer-readable medium whose contents cause a computer system to manage the size of a representation of a result, the representation of the result set comprising an ordered plurality of rows, at least some of the rows containing row data, each of the rows containing a bookmark usable to retrieve row data for the row, by performing the steps of:
determining that the size of the representation of the result set should be reduced;
in response to the determining step, identifying a subset of the rows of the representation of the result set that is contiguous within the order of the representation of the result set, at least some of the rows in the identified subset containing row data; and
removing from the representation of the result set any row data contained by rows among the identified subset while retaining in the representation of the result set the bookmarks contained by rows among the identified subset, such that the size of the representation of the result set is reduced.

39. The computer-readable medium of claim 38 wherein the contents of the computer-readable medium further cause the computer system to perform the steps of:
receiving a request to return the row data for a specified row of the identified subset; and
in response to the receiving step:
using the bookmarks retained in the representation of the result set for rows of the identified subset to restore into the representation of the result set the row data for each row of the identified subset, and
returning the restored row data for the specified row.

40. The computer-readable medium of claim 38 wherein the contents of the computer-readable medium further cause the computer system to perform the steps of:
receiving a request to return the row data for a specified row of the identified subset; and
in response to the receiving step:
using the bookmark retained in the representation of the result set for the specified row to retrieve the row data for the specified row, and
returning the retrieved row data.

41. A method in a computer system for responding to requests each requesting the contents of a specified row of a query result set, the method comprising the steps of:
receiving a first request requesting the contents of a first specified row;
in response to receiving the first request:
determining that the first specified row is among a subset of the rows of the result set whose row contents have been partially discarded, but whose remaining row contents include, for each row, a bookmark usable to efficiently retrieve complete contents for the row,
retrieving the contents of each row of the subset using the bookmarks, and
returning the retrieved contents of the first specified row;
receiving a second request requesting the contents of a second specified row that is also among the subset; and
in response to receiving the second request, returning the retrieved contents of the second specified row.

42. A computer-readable medium whose contents cause a computer system to respond to requests each requesting the contents of a specified row of a query result set by performing the steps of:
receiving a first request requesting the contents of a first specified row;
in response to receiving the first request:
determining that the first specified row is among a subset of the rows of the result set whose row contents have been partially discarded, but whose remaining row contents include, for each row, a bookmark usable to efficiently retrieve complete contents for the row,
retrieving the contents of each row of the subset using the bookmarks, and
returning the retrieved contents of the specified row;
receiving a second request requesting the contents of a second specified row that is also among the subset; and
in response to receiving the second request, returning the retrieved contents of the second specified row.

43. A computer-readable medium whose contents cause a computer system to respond to requests each requesting the contents of a specified row of a query result set by performing the steps of:
receiving a first request requesting the contents of a first specified row;
in response to receiving the first request:

determining that the first specified row is among a subset of the rows of the result set whose row contents have been completely discarded, retrieving the contents of each row of the subset by reexecuting the query for the subset, and returning the retrieved contents of the specified row;

receiving a second request requesting the contents of a second specified row that is also among the subset; and in response to receiving the second request, returning the retrieved contents of the second specified row.

44. A method in a computer system for responding to requests each requesting the contents of a specified row of a query result set, the method comprising the steps of:

receiving a first request requesting the contents of a first specified row;

in response to receiving the first request:
determining that the first specified row is among a subset of the rows of the result set whose row contents have been completely discarded, retrieving the contents of each row of the subset by reexecuting the query for the subset, and returning the retrieved contents of the specified row;

receiving a second request requesting the contents of a second specified row that is also among the subset; and in response to receiving the second request, returning the retrieved contents of the second specified row.

45. A computer-readable medium whose contents cause a computer system to instantiate the following programmatic objects for managing a database query result set in a limited amount of memory:

a table object having the following methods:
a method invocable by a row source program to supply to the table with rows of the result set, a method invocable by a row sink program to request row data for rows in the result set provided by the row source program, a method for checking and adjusting overall memory usage, and a segment type changing method for changing the type of a segment object to a type that maintains less information for the rows it manages when the table object determines that the size of the segment should be reduced, the segment type changing method being invoked by the method of the table object for checking and adjusting overall memory usage; and a plurality of segment objects, each segment object for managing the row data for a portion of the rows in the result set, each segment object being of one of a range of two or more types, each type of segment object maintaining a different level of information about the rows whose row data it manages, the segment objects each having the following methods:

a method invocable by the table to add rows to the segment object, a method invocable by the table for requesting the row data for rows managed by the segment object, and a method invocable by the segment type changing method of the table to transfer the row data for rows of the segment object to the segment object of the new type, such that the table and segment objects can be employed to expeditiously service row data requests from the row sink program while utilizing a limited amount of memory.

46. An apparatus for managing a query result set comprising an ordered series of rows produced in response to a database query, each row having contents, the apparatus comprising:

a memory for containing the query result set, the query result set being divided in the memory into a plurality of segments each containing a distinct subset of the rows of the result set that is contiguous within the ordered series of rows;

a result set size monitor that determines when the amount of the memory occupied by the result set should be reduced; and a result set size reduction subsystem that, in response to a determination by the result set size monitor that the size of the result set should be reduced, reduces the amount of the memory occupied by the result set by:

selecting a segment for which row contents are relatively unlikely to be requested, and for each row of the selected segment, deleting at least a portion of the contents of the row.

47. The apparatus of claim 46 wherein the result set size reduction subsystem deletes the entire contents of each row of the selected segment.

48. The apparatus of claim 46, further comprising:

a request receiver for receiving requests each requesting the contents of a specified row of the result set; and a segment restoration subsystem that, when a request is received by the request receiver for the contents of a row within the selected segment, restores the deleted contents of the rows of the selected segment to the selected segment stored in the memory.

49. A method in a computer system for responding to requests each requesting the contents of a specified row of a query result set, each row of the query result set having row information, the method comprising the steps of:

dividing the rows of the query result set into a plurality of segments;

discarding at least a portion of the row information of each row of a selected segment in order to reduce the amount of memory used to store the result set;

after the discarding step, receiving a request for a specified row of the selected segment; and in response to the receiving step:
subdividing the rows of the selected segment into a plurality of subsegments, for each row of the subsegment containing the specified row, but for none of the rows of the subsegments not containing the specified row, retrieving the row data of the row discarded in the discarding step, and returning the row data for the specified row, including the retrieved row data.

50. A method in a computer system for maintaining a query result set using a plurality of row information segments, the query result set comprised of rows each comprised of row information, each segment representing a portion of the rows of the result set, the row information segments being coordinated by a primary table, the method comprising the steps of:

for each row of the result set:
receiving the row information for the row, under the control of the primary table, identifying a segment in which to represent the row, and storing at least a portion of the received row information for the row in the identified segment of the primary table;

under the control of the primary table, discarding at least a portion of the row information stored for each row of a selected segment of the primary table in order to reduce the amount of memory used to store the result set;

after the discarding step, receiving a request for a specified row of the selected segment of the primary table; and in response to the step of receiving a request:
creating a secondary table having its own segments, for each row represented by the selected segment:
retrieving the row information for the row;
under the control of the secondary table, identifying a segment of the secondary table in which to represent the row; and
storing at least a portion of the retrieved row information for the row in the identified segment of the secondary table, and
replacing the selected segment of the primary table with the segments of the secondary table.

51. The method of claim 50 wherein the step of receiving row information for a portion of the rows of the result set occurs after the step of receiving a request.

52. The method of claim 50, further comprising the steps of:
receiving a request to delete a row of the result set for which row information has been received; and
in response to the step of receiving a request to delete the row, deleting the row from the segment in which the row is represented.

53. A method in a computer system for maintaining the state of a result set produced in response to a database query, the result set being comprised of rows, the method comprising the steps of:

receiving a plurality of row addition requests from a row source program each specifying a row to be added to the result set;

for each received row addition request, processing the row addition request to modify the state of the result set established by processing earlier-processed row addition requests to reflect the addition of the row specified by the row addition request;

receiving a plurality of row retrieval requests each specifying a row to be retrieved from the result set from a row sink program that is distinct from and that operates asynchronously with respect to the row source program, such that receipt of at least one row retrieval request is succeeded by receipt of at least one row addition request; and for each received row retrieval request, processing the received row retrieval request to retrieve the row specified by the row retrieval request in accordance with the state of the result set established by processing earlier-processed row addition requests.

* * * * *